US007131585B2

(12) United States Patent
Gyi et al.

(10) Patent No.: US 7,131,585 B2
(45) Date of Patent: Nov. 7, 2006

(54) INVENTORY MANAGEMENT SYSTEM AND METHODS FOR SECURE IDENTIFICATION DOCUMENT ISSUANCE

(75) Inventors: Justin Gyi, Merrimack, NH (US); Xin Dong, Burlington, MA (US); Lawrence J. Kaylor, Westford, MA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/014,195

(22) Filed: Dec. 15, 2004

(65) Prior Publication Data

US 2005/0156035 A1 Jul. 21, 2005

Related U.S. Application Data

(60) Provisional application No. 60/259,847, filed on Dec. 15, 2003.

(51) Int. Cl.
*G06F 19/00* (2006.01)
*G06Q 30/00* (2006.01)
*G06Q 90/00* (2006.01)

(52) U.S. Cl. ............................ 235/385; 705/22; 705/28
(58) Field of Classification Search ................ 235/384, 235/385, 375, 383, 380, 487; 705/22, 28
See application file for complete search history.

(56) References Cited

U.S. PATENT DOCUMENTS

| 5,216,612 | A | 6/1993 | Cornett et al. |
| 5,305,199 | A | 4/1994 | LoBiondo et al. |
| 6,073,114 | A | * | 6/2000 | Perkins et al. .............. 705/28 |
| 6,233,409 | B1 | 5/2001 | Haines et al. |
| 6,386,772 | B1 | 5/2002 | Klinefelter et al. |
| 6,405,924 | B1 | * | 6/2002 | Shah .................... 235/462.08 |
| 6,536,660 | B1 | 3/2003 | Blankenship et al. |
| 6,789,729 | B1 | * | 9/2004 | Solan et al. ................ 235/375 |
| 6,795,823 | B1 | * | 9/2004 | Aklepi et al. ................ 707/10 |
| 6,883,710 | B1 | * | 4/2005 | Chung ........................ 235/385 |
| 6,900,731 | B1 | * | 5/2005 | Kreiner et al. ........... 340/572.1 |
| 6,963,351 | B1 | 11/2005 | Squires et al. |
| 2002/0143598 | A1 | 10/2002 | Scheer |
| 2002/0186406 | A1 | 12/2002 | Phillips et al. |
| 2002/0188529 | A1 | 12/2002 | Krever |
| 2003/0135431 | A1 | 7/2003 | Schwartz et al. |

(Continued)

OTHER PUBLICATIONS

Digimarc Technical Proposal for a Digital Driver License System in Response to the State of Indiana Bureau of Motor Vehicles Request for Proposal-3-69, May 21, 2003; excerpts as follows: Table of Contents (2 pp.), Foreword (1 p.), Section 3.1—Executive Summary (9 pp.), and Section 3.10—Supply/Inventory Specifications (15 pp.). (Note that this document quotes specifications authored by the State of Indiana.).

(Continued)

*Primary Examiner*—Thien M. Le
*Assistant Examiner*—Edwyn Labaze
(74) *Attorney, Agent, or Firm*—Digimarc Corporation

(57) ABSTRACT

An inventory management system tracks consumables used in creation of secure documents through an identification document issuance process. The system assigns states to card and non-card consumables, and these states are used to track consumables from the vendor's inventory to the issuer's inventory. The system includes functions for managing inventory, shipping and receiving, use management, inventory auditing and secure material destruction. Electronic packing lists are transmitted between vendor and issuer systems to verify shipments. Embedded identification numbers, carried in machine readable codes on consumables, are used to track consumables through the document creation and issuing process.

24 Claims, 24 Drawing Sheets

U.S. PATENT DOCUMENTS

| | | | |
|---|---|---|---|
| 2003/0139982 A1 | 7/2003 | Schwartz et al. | |
| 2004/0069845 A1* | 4/2004 | Goldstein et al. | 235/380 |
| 2004/0103048 A1 | 5/2004 | Vitulli et al. | |
| 2004/0215468 A1 | 10/2004 | Doeberl et al. | |
| 2005/0006470 A1* | 1/2005 | Mrozik et al. | 235/385 |
| 2005/0283411 A1 | 12/2005 | Rhea | |

OTHER PUBLICATIONS

Letter from State of Indiana, Department of Administration, Procurement Division, dated Oct. 31, 2003, transmitting Revised Required Specifications; excerpts as follows: letter, and Section 3.10—Supply/Inventory Specifications (3 pp.).

State of Florida, Change to Invitation to Negotiate, 003-02, 2002; excerpt: Section 5.1.26—Optional Features (3 pp.).

State of Florida, Correspondence Concerning Invitation to Negotiate, 003-02, 2002; excerpts as follows: Table of Contents (1 p.), Table with questions including #73, re Section 5.1.26 h (1 p.), and Questions 51-53, with associated Responses (1 p.).

Digimarc Proposal to State of Florida Department of Highway Safety and Motor Vehicles, for the Digital Imaging Driver License Issuance System, Jun. 26, 2002, excerpts as follows: Table of Contents (2 pp.), Section 2—Executive Summary (14 pp.), portion of Section 5.1.10—System Security re Embedded Inventory Control Number (EIN) Process (3 pp.), and portion of Section 5.1.16—Supplies and Support Services (6 pp.).

Digimarc Proposal to State of Tennessee, 2002; excerpts as follows: Table of Contents (2 pp.), Section 3.29—Reports and Supplies (5 pp.).

Bid Documents: Digital Image Capture System for New Jersey Motor Vehicle Services, Jan. 2003; excerpts as follows: Table of Contents (2 pp.); Section 3.2—System Specifications (2 pp.); Section 3.5—Supplies and Support Services (1 p.).

Letter from State of New Jersey, Department of the Treasury, Division of Purchase and Property, dated Jan. 31, 2003, re Addendum to Digital Image Capture System for New Jersey Motor Vehicle Services Solicitation, first 16 pp. only.

Digimarc Proposal to State of New Jersey, Feb. 2003; excerpts as follows: Table of Contents (3 pp.), Chapter 2—Management Overview/Executive Summary (7 pp.), Section 3.5—Supplies and Support Services (3 pp.).

* cited by examiner

Monthly Consumables Statistics Report
By Type
Production Date Time: 30 June 2003 (22:35:26)

Cards

| Office | Beginning Inventory | Received from Vendor | Issued | Transferred | Marked For Destruction (Production Rejects) | Unaccounted For | Destroyed | Marked For Destruction (Returned) | Ending Balance (On-Hand) |
|---|---|---|---|---|---|---|---|---|---|
| Eatontown | 8000 | 18000 | 12000 | 0 | 12 | 5 | 16 | 18 | 13983 |
| Morristown | 5000 | 9000 | 9000 | (500) | 5 | 0 | 4 | 200 | 5495 |
| Rahway | 3000 | 12000 | 8000 | 0 | 0 | 1 | 2 | 500 | 6999 |
| Trenton | 10000 | 15000 | 10000 | 500 | 2 | 0 | 0 | 12 | 14498 |
| ... | | | | | | | | | 0 |
| ... | | | | | | | | | 0 |
| Total | 26000 | 54000 | 39000 | 0 | 19 | 6 | 22 | 730 | 40975 |

Print Ribbon

| Office | Beginning Inventory | Received From Vendor | Depleted | Transferred | Marked For Destruction | Unaccounted For | Destroyed | On-Hand |
|---|---|---|---|---|---|---|---|---|
| Eatontown | 20 | 4 | 7 | | 7 | | 9 | 10 |
| Morristown | 20 | 10 | 10 | | 10 | | 3 | 10 |
| Rahway | 20 | 5 | 10 | | 10 | | 5 | 5 |
| Trenton | 15 | 3 | 4 | | 6 | | 13 | 8 |
| ... | | | | | | | | 0 |
| ... | | | | | | | | 0 |
| Total | 75 | 22 | 31 | 0 | 33 | 0 | 30 | 33 |

Bottom Laminate

Cleaning Tape

Top Laminate

Monthly Consumables Statistics Report
By Office
Production Date Time: 30 June 2003 (22:35:26)

| Consumable Type | Beginning Inventory | Received from Vendor | Issued (or) Depleted | Transferred | Marked For Destruction (Production Rejects) | Unaccounted For | Destroyed | Marked For Destruction (Returned Cards) | Ending Balance (On-Hand) |
|---|---|---|---|---|---|---|---|---|---|
| Office: Trenton | | | | | | | | | |
| Cards | 10000 | 15000 | 10000 | 500 | 2 | 1 | 91 | 12 | 14497 |
| Print Ribbon | 15 | 3 | 4 | | 6 | | 13 | | 8 |
| Bottom Laminate | 20 | 20 | | | | | 62 | | 40 |
| Cleaning Tape | 1 | 1 | | | | | 4 | | 2 |
| Top Laminate | 20 | 20 | | | | | 62 | | 40 |
| Office: Morristown | | | | | | | | | |
| Cards | 5000 | 9000 | 9000 | (500) | 5 | 1 | 4 | 200 | 5494 |
| Print Ribbon | 20 | 10 | 10 | | 10 | | 5 | | 10 |
| Bottom Laminate | 20 | 20 | | | | | 62 | | 40 |
| Cleaning Tape | 1 | 1 | | | | | 4 | | 2 |
| Top Laminate | 20 | 20 | | | | | 43 | | 40 |

...
...

All Offices Overall Total

| Consumable Type | Beginning Inventory | Received from Vendor | Issued (or) Depleted | Transferred | Marked For Destruction (Production Rejects) | Unaccounted For | Destroyed | Marked For Destruction (Returned Cards) | Ending Balance (On-Hand) |
|---|---|---|---|---|---|---|---|---|---|
| Cards | 245700 | 200000 | 325000 | | | 2 | 3000 | | 120698 |
| Print Ribbon | 400 | 100 | | | | | 26 | | 500 |
| Bottom Laminate | 755 | 100 | | | | | 200 | | 855 |
| Cleaning Tape | 50 | 46 | | | | | 40 | | 96 |
| Top Laminate | 600 | 200 | | | | | 200 | | 800 |

Fig. 10

Sending/Receiving - Home Page

Auditor / Purchasing Manager - Home Page

Fig. 14

Sending/Receiving Application
Receiving Card Stock from Digimarc into Inventory

Inventory Management System
Update Other Inventory

UPS Tracking Number  1Z 57V 021 02 9712 2411

Expected Items:

| | Item | Expected Count | Received Count |
|---|---|---|---|
| 1 | Print Ribbon | 15 | |
| 2 | Top Laminate | 4 | |
| 3 | Bottom Laminate | 4 | |

OK    Cancel

Sending/Receiving Application
Receiving Non-Card-Stock into Inventory

Fig. 15

Inventory Management System
Sending Consumables to Other Agency Site

Scan UPS Tracking Number: 1Z 57V 021 02 9712 2411

Sending from here to: Haddon Heights

Scan Barcode of Card Stock Items here:

| Item # | Item Type | EIN (Scanned or Manually entered) |
|---|---|---|
| 1 | Card Box | 94028424248722472043 |
| 2 | | |
| 3 | | |
| 4 | | |

Enter Other Consumable Items being sent

| | Item | Count |
|---|---|---|
| 1 | Print Ribbon | 6 |
| 2 | Top Laminate | 4 |
| 3 | Bottom Laminate | 4 |

OK    Cancel

Sending/Receiving Application
Sending Consumables to another Agency Office

Fig. 17

Inventory Management System
Update Card Inventory

UPS Tracking Number ( 1Z 57V 021 02 9712 2411 )

Scanned: 37727287482749287749827947

Expected Items:

| Item # | Item Type | Barcode Value (Expected Values) | Received |
|---|---|---|---|
| 1 | Card Box | 7287q177712317331 we0w0 | ☐ Received |
| 2 | Card Tray | 787e8787e0080e98w0980q0w | ☑ Received |
| 3 | Card Tray | 8218131ewq02177131818130198 | ☐ Received |
| 4 | Card Pack | 37727287482749287749827947 | ☑ Received |

Unexpected Items:

| Item # | Item Type | Barcode Value |
|---|---|---|
| 1 | Card Pack | 932809842248204 |
| 2 | Unknown | 9838424242002 |

OK  Cancel

Sending/Receiving Application
Receiving Card Stock into Inventory

Fig. 18

Inventory Management System
Update Other Inventory

UPS Tracking Number: 1Z 57V 021 02 9712 2411

Expected Items:

| | Item | Expected Count | Received Count |
|---|---|---|---|
| 1 | Print Ribbon | 15 | |
| 2 | Top Laminate | 4 | |
| 3 | Bottom Laminate | 4 | |

OK   Cancel

Sending/Receiving Application
Receiving Non-Card-Stock into Inventory

Fig. 19

Inventory Management System
Sending Consumables to Destruction Site

Scan UPS Tracking Number: 1Z 57V 021 02 9712 2411

Scan (or enter) EIN for cards: 9402842424872472043

[Add to Card List]

| Item # | Item Type | EIN (Scanned or Manually entered) |
|---|---|---|
| 1 | Card | 9402842424872472043 |
| 2 | | |
| 3 | | |
| 4 | | |

Enter Other Consumable Items being sent

| | Item | Count |
|---|---|---|
| 1 | Print Ribbon | 30 |
| 2 | Top Laminate | 20 |
| 3 | Other | 4 |

[OK] [Cancel]

Sending/Receiving Application
Sending Depleted Consumables for Destruction

Fig. 20

Inventory Management System
Receive and Destroy

UPS Tracking Number: 1Z 57V 021 02 9712 2411

Scanned: 3772728748274928749827947

Expected Items:

| Item # | Item Type | Barcode Value (Expected Values) | Destroyed |
|---|---|---|---|
| 1 | Card Box | 7287q1777123173331 we0w0 | ☐ Destroyed |
| 2 | Card Tray | 787e8787e0080e98w0980q0w | ☑ Destroyed |
| 3 | Card Tray | 8218131ewq021771318183018 | ☐ Destroyed |
| 4 | Card Pack | 3772728748274928749827947 | ☑ Destroyed |

Expected Items:

| Item # | Item | Expected Count | Destroyed Count |
|---|---|---|---|
| 1 | Print Ribbon | 15 | |
| 2 | Top Laminate | 4 | |
| 3 | Bottom Laminate | 4 | |

[OK]  [Cancel]

Sending/Receiving Application
Receiving Items for Destruction
(Changing status of inventory to "Destroyed")

Fig. 21

Inventory Management System
Use Management - Card Consumables

Card Pack (Scan): 1Z 57V 021 02 9712 2411

Issued for Use:

| Item | Type | Status | Barcode |
|---|---|---|---|
| 1 | Card Pack | In Use | 71731731719237 |
| 2 | Card Pack | In Use | 21790982984302 |

EIN (Mark card for destruction): 1Z 57V 021 02 9712 2411

| Count | Barcode | Status |
|---|---|---|
| 1 | 1Z 57V 021 02 9712 2411 | MFD |

Done

Use Management Application
Managing Card Consumables

Fig. 22

Use Management Application
Managing Non-Card Consumables

Inventory Count

Select Location: Eatontown

[ Get Inventory Data ]

Card Package

| Type | Barcode | In Inventory |
|---|---|---|
| Card Box | 24215215582150 4 | ☒ |
| Card Tray | 06721945724974 37 | ☒ |
| Card Tray | 42904724249827 94 | ☒ |
| Card Pack | 40214927742398 47 | ☒ |
| Card Pack | 09272527502752 48 | ☒ |

Barcodes of Card Packages: [         ]

[ Verify Card Inventory ]

Other Consumables

| Type | Expected Count | Actual Count |
|---|---|---|
| Top Laminate | 5 | 0 |
| Bottom Laminate | 5 | 0 |
| Print Ribbon | 6 | 0 |
| Cleaning Tape | 2 | 0 |

[ Produce Discrepancy Report ]

Fig. 25

Inventory Count - Discrepancy Report

Location: Eatontown　　　　　　　　　　　　　　　　　　　Date: 07/22/2003

Card Package - Verified

| Type | Barcode |
|---|---|
| Card Box | 2421521557821504 |
| Card Tray | 0672194572497437 |
| Card Tray | 4290472424982794 |
| Card Pack | 4021492774239847 |

Card Package - Missing

| Type | Barcode |
|---|---|
| Card Pack | 0927252750275248 |

Card Package - Not Recorded

Other Consumables

| Type | Expected Count | Actual Count | Discrepancy |
|---|---|---|---|
| Top Laminate | 5 | 5 | 0 |
| Bottom Laminate | 5 | 5 | 0 |
| Print Ribbon | 6 | 5 | -1 |
| Cleaning Tape | 2 | 3 | 1 |

[Return to Start Page]

Fig. 26

INVENTORY MANAGEMENT SYSTEM AND METHODS FOR SECURE IDENTIFICATION DOCUMENT ISSUANCE

RELATED APPLICATION DATA

This application claims benefit of Ser. No. 60/259,847, filed Dec. 15, 2003, which is hereby incorporated by reference.

TECHNICAL FIELD

The invention relates to issuance systems for secure identification documents, and specifically, to inventory management of consumables used in issuing identification documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

FIGS. 1 and 2 illustrate a front view and cross-sectional view (taken along the A—A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birth date, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material (e.g., TESLIN (available from PPG Industries), polyvinyl chloride (PVC) material, polyester, polycarbonate, etc.). The core 20 is laminated with a transparent material, such as clear PVC or polyester material 22, which, by way of example, can be about 1–5 mil thick. The composite of the core 20 and clear laminate material 22 form a so-called "card blank" 25 that can be up to about 30 mils thick. Information 26a–c is printed on the card blank 25 using a method such as Laser Xerography or Dye Diffusion Thermal Transfer ("D2T2") printing (e.g., as described in commonly assigned U.S. Pat. No. 6,066,594, which is incorporated hereto by reference in its entirety.) The information 26a–c can, for example, comprise variable information (e.g., bearer information) and indicia, such as the invariant or non-varying information common to a large number of identification documents, for example the name and logo of the organization issuing the documents. The information 26a–c may be formed by any known process capable of forming the indicia on the specific core material used.

To protect the information that is printed, an additional layer of transparent overlaminate 24 can be coupled to the card blank and printed information, as is known by those skilled in the art. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1–20 mils. Lamination of any laminate layer(s) to any other layer of material (e.g., a core layer) can be accomplished using a lamination process.

In ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581.

Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

Methods for Issuing Identification Documents

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if large volumes of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document.

It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5–2.0 mil (13–51 .mu.m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125–0.250 mil, 3–6 .mu.m) overlay patches applied at the printhead, holographic hot stamp foils (0.125–0.250 mil 3–6 .mu.m), or a clear polyester laminate (0.5–10 mil, 13–254 .mu.m) supporting common security features. These last two types of protective foil or laminate sometimes are applied at a laminating station separate from the printhead. The choice of laminate dictates the degree of durability and security imparted to the system in protecting the image and other data.

Inventory Management for ID Issuance Systems

Because of the important role that identification documents play as a secure credential, the security of the documents and issuing system is a primary concern. One troubling source of counterfeit documents is the use of stolen or lost ID document consumables to create counterfeit ID documents that might appear authentic because they are created from the same materials as valid ID documents using the same or similar printing techniques.

ID document consumables fall into two primary classes of materials: card and non-card consumables. The card consumable refers to the card stock, where as the non-card consumables include other materials used in combination with the card stock to make the finished ID document, including, for example, laminate (top and bottom), printer ribbons, cleaning tape, etc.

In view of this source of fraudulent ID documents, there is a need for systems and processes that provide tighter control over the use of ID document consumables. Such a system should preferably track the consumables from creation, through inventory, shipment, use and destruction of waste. Also, the system should associate the consumables with a record of a valid ID document issuance so that invalid documents can be detected and discriminated from valid documents.

This document details inventory management systems, methods and software modules for tracking consumables used in ID document issuance. Examples of features are summarized in the claims and are described throughout the document. These features may be used in various novel combinations to track consumable inventory automatically between ID document vendor and issuer systems and to capture data used to validate suspect ID documents based on embedded inventory data in the documents.

Further features will become apparent with reference to the following detailed description and accompanying drawings.

BRIEF DESCRIPTION OF THE DRAWINGS

FIGS. 9–10 illustrate examples of periodic reports showing consumables activity.

FIGS. 14–26 show various interfaces used for managing the sending and receiving of consumables, use management, and inventory auditing in the inventory management system.

DETAILED DESCRIPTION

Figure 1:
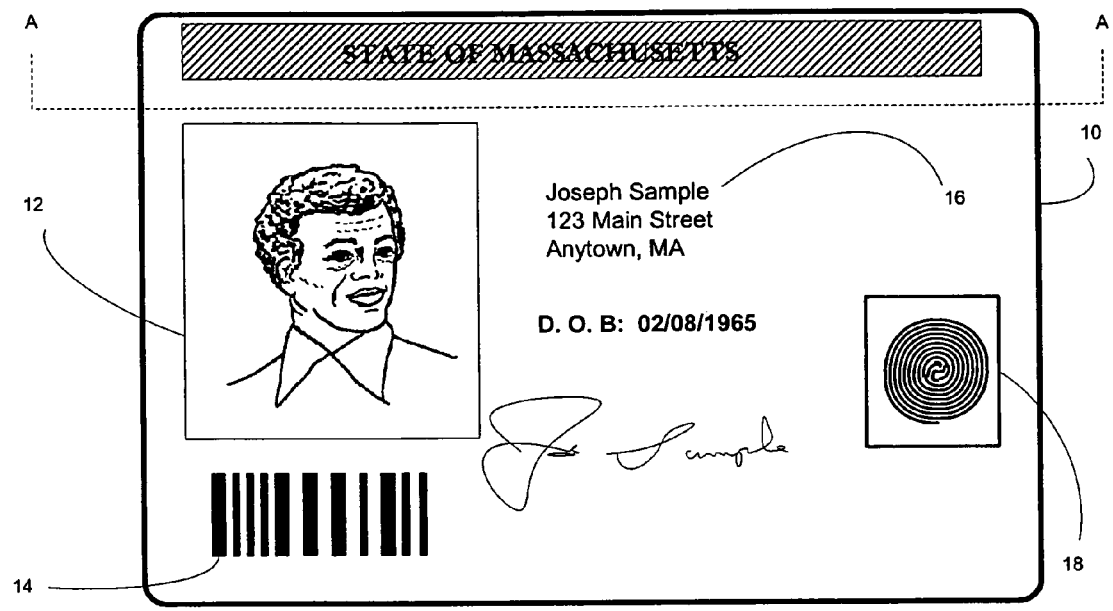
FIG. 1 illustrates a front view of an identification (ID) document.
Figure 2:
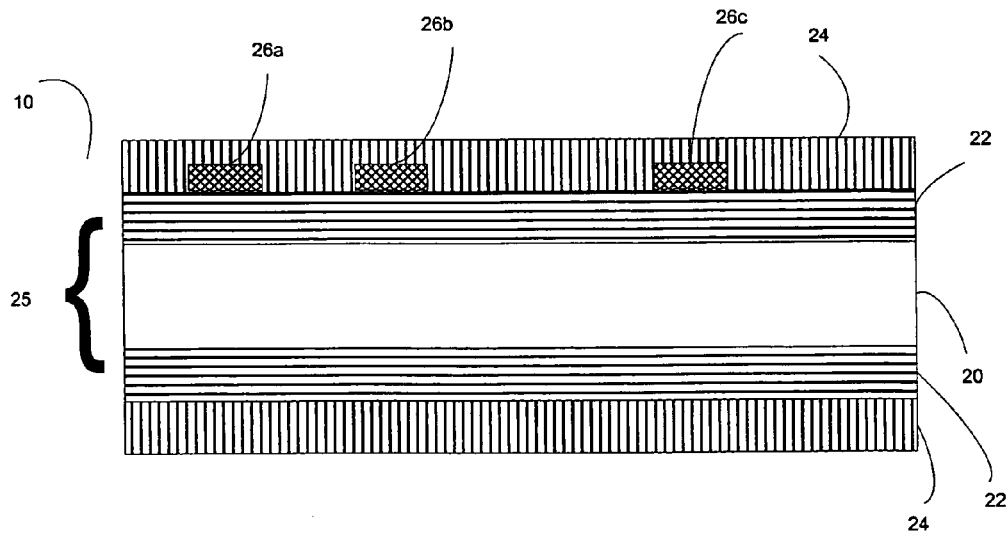
FIG. 2 illustrates a cross-sectional view of an identification (ID) document.
Figure 3:
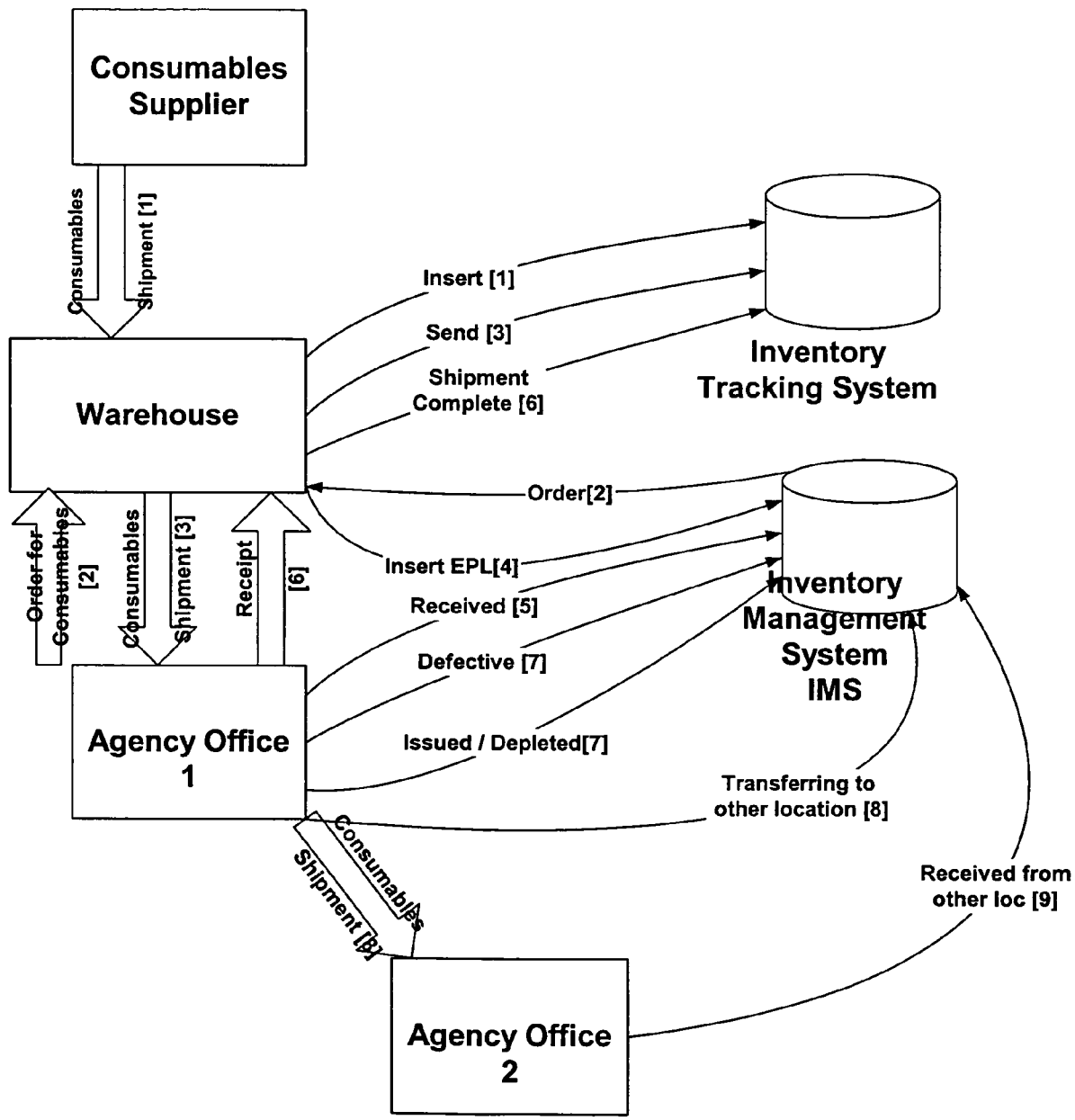
FIG. 3 is a system and process diagram illustrating inventory tracking and management systems for an ID document issuance system.

FIG. 3 is a system and process diagram illustrating inventory tracking and management systems for an ID document issuance system. This system provides a number of functions, including consumables ordering; consumables movement tracking; consumables usage tracking; card tracking; and card verification. We use the term card to refer to the identification document item, and do not intend to limit the system to a particular ID document structure.

This system manages ID document consumables through the ID card creation and issuance process to identify missing or stolen consumables. To accomplish this task, the system defines stages of the ID issuance process, such as, shipment, inventory, and transfer among issuer offices. The system also defines states for the consumables within these stages, such as "in inventory", "in use", "issued", "marked for destruction", "destroyed". The system defines actors in the issuance process and their corresponding roles in the issuance process. These roles establish their permissions and responsibilities in the process of tracking the consumables state as the consumables flow through the issuance process.

In addition, the system maintains an association between the consumables used to create a particular card with a particular ID document record to enable the validity of a suspect document to be verified by comparing the observed information on a suspect ID document with corresponding information about the document and the document's bearer in a database. In particular, one or more of the ID card consumable components are uniquely serialized with inventory number, and these numbers are read and stored with the ID document record along with other information about the bearer at the time that a valid document is printed. In one implementation, unique serial numbers for each of the consumables used to create the card are read at card creation time from machine readable codes on the consumables (or their packaging) and/or the inventory management system and stored in a database record along with other information about the document and its bearer such as name, date of birth, PIN, biometric information such as facial photo, fingerprint, hand written signature, iris/retinal scan. Additional forensic tracking information such as the name of the capture station operator, printer ID, capture station device IDs are also stored in the database record for later verification. To verify a suspect card, this information is read from the suspect card and compared with the information in the database record corresponding to that card. Some of this information may also be hidden in one or more machine readable data carriers on the card itself for verification without the need to access the database record.

Before describing the system and ID card workflow in the figures, we begin by providing an overview of the entities involved in the process. These entities include:

1. the consumables suppliers, which supply consumables like card stock, laminate, printer ribbon, etc.;

2. the card system vendor that builds the card issuance system and manages card production, and in particular, manages the flow of card consumables into valid ID documents issued by an issuer; and 3. issuer that issues identification documents to individuals.

In some circumstances, one entity may perform a combination of roles of consumable supplier, vendor and/or issuer.

The system shown in the figures (e.g., FIG. 4) has two database management systems: one maintained by the vendor entity called the vendor inventory tracking system (ITS), and a second maintained within the card issuer system called the issuer inventory management system (IMS). Each of these systems is implemented in a networked computer system in which the database executes on one or more server computers, and actors in the workflow access the servers via client devices. In current implementations, the client devices are computers that access the servers via web interface modules. The arrows leading to and from the ITS and IMS represent electronic transactions communicated over a network via this system architecture.

The ITS comprises a database management system and supporting software that:

1. Records incoming shipments from consumable suppliers;

2. Records inventory of issuers' consumables at vendor warehouse(s);

3. Records outgoing shipments of consumables to issuer agency offices.

The IMS comprises a database management system and supporting software that:

1. Records data of incoming shipments to agency offices, e.g., order number, ship date, shipper tracking number, and contents.

2. For card packages, records the ID of the pack, tray and box, along with location and status (in-inventory, in-use, depleted, missing, transferred).

3. For cards, records an embedded inventory number (EIN) of the card, location, and status (e.g., in-inventory, issued, defective).

4. Relates the EIN to the pack, tray and box it came from.

5. Records quantity of non-card consumables (laminate, print cartridges, cleaning tapes) by location; and records serial numbers of non-card consumables. In particular, the card and non-card consumables may be tracked by count (e.g., the state of the consumable is tracked by the quantity or "count" of consumable items flowing into a facility, out of a facility, consumed, or destroyed), by serial number, or by count and serial number.

In one implementation the serial numbers of the consumables are carried by machine readable and human readable codes on the consumables and their packaging. Examples include 1 and 2D barcodes, digital watermarks, magnetic stripes, IC chips, laser readable media, etc. This machine readable code enables automated tracking of the consumables through the ID document issuance process.

Having provided an overview of the system, we now describe its operation as consumables flow from supplier to card production and card issuance. In the following description, the number of each of the steps in the workflow is used to annotate the associated actions in the system of FIG. 3.

1. Shipment Received from Supplier

The flow of consumables begins with a shipment received from a consumable supplier at the vendor warehouse. At this stage, the inventory is updated in the vendor ITS to reflect the change in consumables inventory at the vendor warehouse. Prior to branch orders being processed within the vendor ITS, the ITS creates barcode labels for all inventory to be shipped. Each consumable's barcode contains the consumable type (card stock, ribbon, front lamina, and back lamina), lot or batch number identified from the manufacturer, and a serialized number.

2. Consumables Order Placed with Vendor

The issuer IMS monitors its inventory levels for consumables, and when they fall below thresholds, places an order to the ITS via a web interface.

3. Shipment to Agency Office

Order fulfillment at the vendor proceeds as follows. The consumables shipment is packaged at the vendor warehouse. As the vendor shipping department creates each shipment, barcodes are attached to each consumable and scanned into the system. This starts the tracking process for the consumable. The issuer's quantity ordered will be decreased and the quantity shipped will be increased.

An Electronic Packaging List (EPL) is built that includes the following information:

Card information, including numbers embedded in the cards (EIN), packaging serial numbers and quantities;

Laminate, ribbon and cleaning tape quantities and serial numbers.

The ITS is updated to reflect the EPL and shipment data (shipper tracking number, ship date).

The shipper then picks up the consumables shipment and delivers it to the appropriate issuer location.

4. Send Electronic Packing List

The ITS then sends the EPL to the IMS via the web interface. The IMS software receives the EPL and inserts it into the database and notes the status as "In Transit". The DITS records the status of these new card records in the DITS as "shipped", and records the target issuer office location.

5. Agency Office Receives Shipment

Next, the consumables shipment arrives at the target office. An authorized issuer agent signs for the shipment. The issuer agent starts the IMS client application executing on the issuer agency workstation (if not already running) and enters the shipper tracking number. The IMS client extracts the expected shipment contents derived from the EPL and displays it for verification. If complete, the agent selects "Shipment Complete" in the client application user interface.

The IMS system updates the card record status for received consumables to: "in-inventory", and for not-received consumables as: "missing".

The consumables quantity on-hand is updated.

The recording of an incomplete shipment includes the scanning of card box IDs and other consumables in the shipment. The agent may also manually enter quantities of consumables (for any not marked with machine readable codes that provide serial numbers and associated quantities of consumables).

6. Shipment Complete Acknowledgement

The ITS receives return receipt from shipper to acknowledge completed shipment. In response, the ITS is updated to reflect that the order is closed and shipment is complete.

7. Card Usage Status Update

As cards are used to create ID documents, the IMS updates the status of the consumables used to create the documents. An operator loads cards into printer. When a card is printed acceptably and scanned (e.g., by scanning the machine readable EIN from the printed card, e.g., from a bar code, magnetic stripe, digital watermark, etc. embedded in the card stock), its status becomes "Issued". If it is the first card in a pack, all other cards in the pack become "in-use". If a card must be reprinted, the original is scanned and given a status of "defective". When all cards in a pack, tray or box are issued, the corresponding status of the corresponding package from which it came (pack, tray or box) becomes "depleted".

Monthly inventory audits adjust the actual inventory records in the IMS.

7a. Other Consumables Inventory Tracking

Other consumables (top laminate, bottom laminate, ribbon, cleaning tape) are tracked by Operator action when each consumable is opened. This tracking can be performed in automated fashion by scanning a code on the packaging or consumable itself when the consumable packaging is opened (or security seal broken). It may also be performed by manual entry of the type and quantity being put into use.

Monthly inventory audits will adjust the actual inventory records in the IMS.

8. Inventory Movement Between Offices (Sending Office)

An IMS client application (running on the capture station within an issuing office) supports movement of inventory between offices. This transfer process begins when the station operator prepares the shipment. The operator enters the quantities, types of consumables, shipment tracking number, etc. in to the IMS database. This can be accomplished by scanning the bar codes of the consumables to be transferred. The Agency supervisor authorizes the shipment in the IMS client application by supplying an override password.

The IMS client application adjusts the on hand quantities for the outgoing office in the IMS.

The shipment is sent. The status on IMS is marked "In Transit."

9. Inventory Movement Between Offices (Receiving Office)

When the transfer shipment is received, the receiving operator uses the IMS client to register the received inventory. The process will be nearly identical to the one used to receive shipments from the vendor as described previously.

10. Serial Number Tracking and Linking to ID Document Record

We noted previously that when a card is acceptably printed, it is scanned. This causes the EIN to be recorded or updated in several places in the system:

1. In the IMS database, the status for an EIN record corresponding to the card is updated to "issued".

2. In the issuer's central image repository, a composite file is written containing the card EIN as well as the serial numbers of other consumables used to create the card. This composite file stores a record of the data on the identification document, applicant information, and transaction information. Examples of its contents include a facial image, fingerprint data, handwritten signature data, EIN of card and other consumables used to make it, document ID, name, address, data of birth of applicant, name of operator that issued the ID, printer ID, workstation ID, applicant PIN number, etc. All, portions, or various combinations and hashes of this data may be embedded in machine readable data carriers on the card for cross verification with the database and with each other at an automated reader.

3. In the issuer's demographic database, the EIN is stored along with other demographic data for the ID document applicant.

Figure 4:
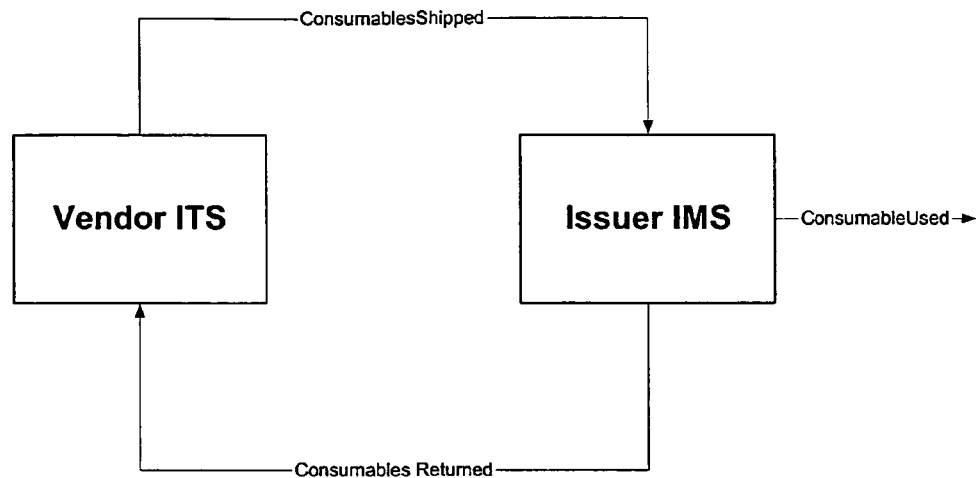
FIG. 4 is a system diagram illustrating the relationship between a vendor inventory tracking system and an issuer inventory management system for consumables used in an ID document issuance process.
Figure 5:
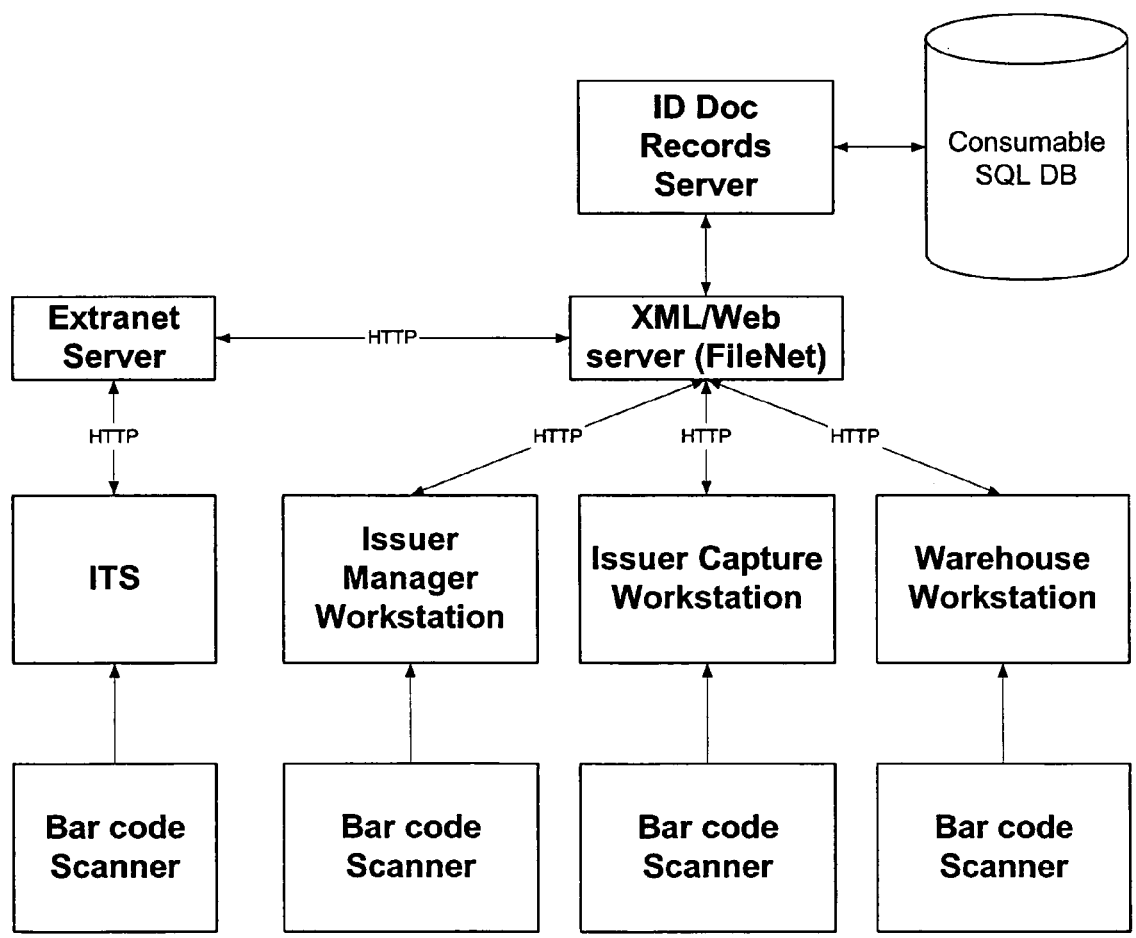
FIG. 5 is a system diagram illustrating an implementation of a vendor inventory tracking system, an issuer inventory management system, and a web interface between the two systems.

FIG. 4 is a system diagram illustrating the relationship between a vendor inventory tracking system and an issuer inventory management system for consumables used in an ID document issuance process. FIG. 5 shows a particular implementation of a vendor inventory tracking system, an issuer inventory management system, and a web interface between the two systems. This particular implementation shows how to implement a web interface between the vendor ITS and issuer IMS.

In one implementation, the ITS transmits the electronic packing lists to the IMS Server (e.g., shown as ID Doc. Records Server in FIG. 5) via a secure file transfer mechanism, such as secure FTP, secure HTTP, SSL, etc. This implementation of the IMS Server sends receipt notification and notification of missing shipment to the ITS via email, but other network communication applications maybe used as well. The issuer capture station sends requests to the IMS Server to update the status of a card via HTTP requests to a web server, which communicates with the IMS server.

More information about a particular implementation of the inventory tracking and management systems is provided below under the heading "Inventor Management Subsystem". This implementation uses embedded inventory numbers (e.g., in machine readable codes on the consumable such as bar code, digital watermark, magnetic stripe, IC chip, etc.) to track cards, and consumable counts to track non-card consumables used to make ID documents. However, machine readable embedded inventory control numbers (associated with consumable type and quantity for each number) can also be used for non card consumables.

11. Inventory Management Subsystem (IMS)

Implementation Protocol

In this implementation, a monthly counting of inventory is performed in agency offices (by designated agency personnel). Issuer provides a workstation to host the web-browser which provides the Graphical User Interface (GUI) for functionality described in this section for the IMS. This workstation has a "wedge" 1-D barcode reader/Keyboard to support scanning of inventory barcodes.

The EIN on a card is always readable either by scanning the barcode or reading and data entering the EIN numbers printed on the card.

It is recommended that ISSUER does not assign the roles of "Sending/Receiving Clerk" and "Use Manager" to the same individual.

Monthly Inventory counting is performed after close of business on the last working day of that month "Security consumables" are defined to be: The upper laminate; the card stock; and the printer ribbons (after the ribbons are used, but not prior to use).

Except for the ICS (Image Capture Station) Operator, each of the user viewpoints represented here accesses the IMS functionality via a MyIssuer Portal The ICS Operator is expected to use all the card stock from a pack (i.e. ensure that all cards in a pack are issued, or marked for destruction) before a new pack is opened and scanned.

ICS Operator Viewpoint

The ICS operator performs several activities related to the use and accounting of all consumables:

The ICS operator requests and retrieves consumables from the use manager (the use manager is another actor described in later paragraphs).

The ICS operator loads the consumables into the over-the-counter printer

After a card is printed, the ICS operator scans the EIN on the card using the barcode reader which is part of the ICS workstation. The ICS application provides support for exceptions such as the ICS Operator inadvertently issuing the document without having scanned the EIN.

After each consumable is depleted, the ICS operator gives these to the consumable use manager for proper processing and recording. In a typical issuer office, the image capture station comprises a computer connected to image capture devices for enrolling applicants of ID documents, including a camera for capturing facial photos, a fingerprint reader, a handwritten signature scanner, and a card reader (for reading machine readable codes, including the EIN from an ID document after it is printed). The computer is also linked via a network to the IMS, to a central image repository (where consumable EINs are linked with a database record for the issued ID document), and typically an issuer demographic database, where more information about the applicant demographics is stored.

Use Manager (and Related) Viewpoints

The use manager is in charge of maintaining the consumable inventory and controlling the use of the consumables. The main functions of the use manager are:

When a consumable is put into use, the use manager updates the inventory record to reflect the fact that the consumable has been taken from the inventory.

When a consumable is depleted (or rejected in the case of cards), the use manager updates the inventory record to reflect the fact that the consumable has been depleted (or rejected for cards).

The Use Manager accepts all cards that need to be destroyed. The card-production process at the ICS will ensure that the state of each card that is rejected, is automatically set to "Marked for Destruction".

Frequently, the Use Manager must ensure that depleted security consumables are physically sent to the designated site for destruction. Although the Use Manager does not have any software supporting this activity (the sending/receiving clerk does), the Use Manager initiates the Sending of the depleted security consumables to the designated site, so that they may be destroyed in a manner acceptable to ISSUER.

The above activities are performed by using the web interface provided for the use manager.

The following subsections define use management for all the various types of consumables. These sections are arranged in order of "Card Packages", "Cards", and "Non- Card Consumables", since these three categories have their own rules regarding usage and post-use handling in this implementation.

Consumables Use Management

Card Packages

Cards are produced and delivered to the Agency Office in some combination of three distinct "Packages". These are:
card box
card tray
card pack In addition, the packaging is hierarchical (that is, a card box contains card trays, and, a card tray contains card packs). For example, a card box contains 4 card trays, a card tray contains 8 card packs, and a card pack contains 100 cards.

When Vendor ships new inventory to an Agency Office, an electronic representation of the shipment (called an Electronic Packing List, or EPL) is sent to the IMS. This EPL represents the totality of all inventory that should be expected by the Agency Office. Each card in the shipment, together with its "containing hierarchy of packages" is represented by the EPL. The containment relationship between card packages are represented in the Electronic Packing List (EPL) and saved in the IMS database when an EPL is processed by IMS.

This hierarchy of packaging is retained in the IMS throughout the life cycle of the consumables. When the use manager opens a card package, the action of scanning the barcode on the card pack that is opened, will automatically adjust the state of the cards contained by that pack, as well as adjusting the states of the containing packages (tray and box). The IMS automatically updates the status of the containing card trays and card boxes, and the use manager need not scan the containing packages nor the individual cards.

Recording an Opened Card Pack

When new card stocks are required, the ICS operator asks the use manager to open a new card pack.

When a card pack is opened, the consumable use manager uses the IMS use manager web interface to scan the barcode of the card pack opened. In case more than one card pack is opened, the use manager may scan more than one barcode into the text field on the web page.

When a card pack is opened, its status is changed from "In Inventory" to "In Use".

Recording a Depleted Card Pack

When all the cards in a pack have been scanned, IMS automatically changes the status of the card pack to "Depleted". In cases where all cards in a given pack have not been scanned (due to such things as the operator forgetting to scan the EIN), the status of the card pack and all "higher level packages" will remain "In Use".

Card

Status Change from "In Inventory" to "In Use"

When a card pack is opened and scanned, IMS automatically changes the status of all the cards in the pack from "In Inventory" to "In Use". If the Use Manager does not scan the pack, issuance (or marking for destruction) of the first card from that pack automatically changes the state of the rest of the cards in that pack (and the state of the pack, tray and box, as applicable) to "In Use".

Status Change from "In Use" to "Issued" or "Marked for Destruction"

After a card has been printed and scanned, its status is changed by the IMS according to the following:
If the card has passed the inspection by the ICS operator and issued, IMS changes its status to "Issued".
If the card has not passed the inspection by the ICS operator and has not been issued, IMS automatically (as a consequence of ICS Operator and Supervisor actions) changes its status to "Marked for Destruction". (The section describing ICS Operator Actor's viewpoint describes the activities that will cause the card to be marked for destruction).

Non-Card Consumable

Non-card Consumables Include the Following Types:
Top laminate
Bottom laminate
Print Ribbon
Cleaning tape The major difference between card and non-card consumables is that the non-card consumables do not possess individual identification numbers such as barcode or EIN. Therefore, non-card consumables are managed by counts. However, in implementations where the non-card consumables also include EINs or other serial number type identifiers, they are tracked in a similar fashion as the card consumables.

Recording an Opened Non-Card Consumable Item

When one or more non-card consumables are opened, the use manager updates the IMS (using the use manager web interface) with the type and count of the items opened.

IMS changes the status of the opened items from "In Inventory" to "In Use".

Recording Depleted Non-Card Consumables

When one or more non-card consumables are depleted, the use manager updates the IMS (using the use manager web interface) with the type and count of the items depleted.

The new status of a depleted non-card consumable item is type dependent. IMS changes the status of a non-card consumable item according the following rules:
For security consumables, the status is changed from "In Inventory" or "In Use" to "Marked for Destruction".
For those items which are not security consumables, the status is changed from "In Inventory" or "In Use" to "Depleted".

Inventory Counting

Inventory counting involves counting all unopened card packages and non-card consumables in the physical inventory and reconciling these items against the IMS inventory records in the IMS database. This task is performed by the consumable use manager using the use manager web interface. An "In-Use Report" which lists the EINs and state of all cards marked "In Use", "Marked for destruction" and "Issued" for the two most recently opened packs at the local Agency, is produced to support the inventory counting process. For each of these packs, the count of unscanned cards (i.e. the total count of "Missing EIN" cards) is provided. The total number of cards per pack as listed in this report (i.e if the count of unscanned cards plus the total number of "In Use", "Marked for destruction" and "Issued") should equal 100. If not, a manual count of all the cards in the printer is performed.

Select Location

The web interface which supports inventory counting supports two separate viewpoints. The use manager's viewpoint restricts the counting of inventory to the specific site at which the physical inventory is taken. The alternate support is provided to the Auditor and the Consumables Purchasing Manager. This alternate support allows these two actors to select the agency office location of interest and then provides the same view available to the use manager at that site.

Counting

IMS displays the inventory records for the office. This display represents the inventory, as stored in the IMS database (and not necessarily the actual inventory on hand). The card packages and non-card consumable items is shown in separate tables.

In the card package table, there is one row for each card package. The card package may be a card box, a card tray or a card pack. For each package, the type and barcode is shown in the first two columns, respectively.

A scrollable text area is provided below the card package table to allow the use manager to enter barcodes of the card packages in the physical inventory. These barcodes are entered (via the barcode reader or by data entry) one per line in the text area. If the user manager clicks on the "Verify Card Inventory" button, the barcodes in the text area are compared with the barcodes in the table. For each match found, the checkbox for the matching row in the table is checked. This feature provides a quick and convenient way for the use manager to find missing card packages. In case the barcodes are entered incorrectly (if entered manually, for instance) in the text area, this feature helps detect the input errors.

Another display is provided for other consumables. There is one row per non-card consumable type. For each type of consumable, the count in the inventory record is displayed in the "Expected Count" column. The expected count column is not changeable. The use manager counts the items for each type of non-card consumable in the physical inventory and selects the corresponding number in the "Actual Count" column.

Generate Inventory Count Discrepancy Report

When the use manager has finished entering the barcodes and counts, a discrepancy report can be obtained by clicking on the "Produce Discrepancy Report" button on the bottom of the page.

The "Discrepancy Report" Page Shows the Following Data:
  Office location where the inventory count is performed.
  Date of report generation.
  Barcode data of each card package for which the inventory record matches the physical inventory.
  ID of the user who inventoried (each of the above)
  Last date and time that (each of the above) data was inventoried
  Missing card packages. The type and barcode are displayed. Date and time of inventory and ID of person performing this inventory will also be displayed
  Card packages that are found in the physical inventory but are not in the inventory record for this location. The type and barcode are displayed. The ID of the user entering this data, and date and time these were noted
  For each type of non-card consumables, the corresponding row displays the type, expected count, the actual count and the difference, together with the date and time and ID of the person performing the inventory Sending/Receiving Clerk Viewpoint The Sending/Receiving Clerk is the person, in the Agency Office or Regional site, who is designated to handle the transfer of consumables to and from that location. This person is responsible for all activities associated with accepting a shipment of consumables (either from Vendor, or from another Agency Office), and for sending consumables (sending consumables to another Agency Office, or sending depleted consumables for destruction to the site designated to perform this destruction).

Vendor provides a web-based interface to the Inventory Management System to support the Sending/Receiving Clerk in performance of the above activities. In order to use this interface, the Sending/Receiving Clerk is required to log on to the IMS (via a web based logon page), and is presented with a "home page" which provides a set of links (there may be additional links presented on the page, depending on the actual group membership of that particular person's roles). The set of functions available to the Sending/Receiving Clerk are:
  Receive Shipment from Vendor
  Receive Shipment from Other Agency Office
  Send Shipment to Other Agency office
  Send Shipment for Destruction The following subsections provide more detail as to how this is accomplished.

Processing Shipments from Vendor Warehouse

When consumables arrive at the Agency Office (this is expected to be via SHIPPER delivery), the Sending/Receiving Clerk logs on to the IMS via the web interface, as described in the previous section, and clicks on the link "Receive Shipment from Vendor". The resulting page is displayed, anticipating the scanning in of the master tracking number. Once this scanning is accomplished, the page refreshes, showing the scanning number and the total number of SHIPPER boxes ("shipment box" in the EPL) which has been shipped to that Office. This first scan of the master tracking number and visual confirmation regarding the total number of "shipment boxes" is a basis for the following:
  Confirmation that the shipment is intended for the receiving Agency Office
  Approval for the Sending/Receiving Clerk to sign for receipt of this shipment (releasing SHIPPER)

If the total number of shipment boxes matches the actual number of boxes delivered by SHIPPER, the clerk is authorized to accept the shipment by signing the SHIPPER receipt. If the number of boxes does not match, this is an exception condition, and SHIPPER should be asked to investigate the missing boxes. The clerk should not sign for the shipment until this is resolved. Resolution may take additional communication between the ISSUER, Vendor, and SHIPPER, but is beyond the scope of the system.

A "radio button" is provided for each case (acceptance/rejection) of the shipment acceptance.

Upon selecting the "Confirmed (Continue)" button, and based on the information in the database, the application will retrieve all information associated with this shipment, and lead the Sending/Receiving Clerk through a sequence of activities. This sequence requires that all the shipment boxes be opened and organized prior to continuing, and will help ensure that all the expected consumables are received. Any discrepancy from expected contents must be coordinated through Vendor within 24 hours of receipt.

At this point, each of the card stock related items (card boxes, card trays and card packs—each item at the "outermost package level"), are scanned. As each item is scanned, the application compares the barcode scanned in with the expected barcode in the database and determines the type of packaging that has been scanned. The web page will be refreshed to show that the item has been successfully received by automatically checking off a "check box". Unexpected items that have been received, will be identified and will be included in a shipment discrepancy report. When this process is completed, the unchecked "check boxes" will indicate any items which were expected but not sent. These will also be included in the shipment discrepancy report. The Sending/Receiving clerk is also required to count the number of each of the remaining consumable items by type (Printer ribbon, Top and Bottom Laminate, and Cleaning rolls if any), and to manually enter these numbers in the spaces provided. When done, pressing the "OK" button causees the status of all the items in the shipment to change to "In Inventory". At this point, the shipment from Vendor to the Agency Office can be considered as complete for the items accepted by the Sending/Receiving Clerk. Resolution for items outstanding (either missing in shipment or excess), are handled manually. Any partial shipment will be rejected and the Agency Office will not accept the shipment.

Sending Inventory to Other Agency Offices

The State Manager initiates the transfer of consumables from one office to another. No transfer can occur without specific authorization (in electronic form) from the State Manger. When consumables need to be shipped to another Agency Office, the Sending/Receiving Clerk will logon to the IMS via the web interface, as described in the previous section, and will click on the link "Send Shipment to Other Agency Office". The resulting page will be displayed, anticipating the scanning in of a master tracking number. Once this scanning is accomplished, the Sending/Receiving clerk can select the name of the other Agency Office, and to scan in the barcodes of the Card Stock Packaging (boxes, trays, packs) which will be packed for shipment to the other Agency.

The Sending/Receiving clerk can also enter the count of the other consumables by type (laminate rolls, print ribbons, etc). When all needed inventory information is entered, the database is updated to reflect that the consumables are in transit (i.e. the receiving office may expect them to arrive via the tracking number). A receipt listing all the contents of the shipment can be printed. The State will be responsible for the physical transfer of inventory. The same process should be used to allow a shipment from a given site to itself (in order to support the move of the same Agency to another location).

Receiving Inventory from Other Agency Offices

Receiving inventory from another Agency Office is similar to receiving inventory from Vendor. There will not be a capability to reject the shipment. Please refer to section entitled "Processing Shipments from Vendor Warehouse" for this activity.

Depleted Inventory Destruction

There is one specially designated location (presumably at ISSUER Headquarters), which is responsible for handling the final disposition of depleted security consumables. One or more persons at this location, are expected to receive only consumables which have been depleted, and are expected to destroy these items in a secure manner which is consistent with ISSUER standards. The functionality which supports acceptance of (depleted) consumables at this site, however, is identical to the functionality which supports acceptance of normal (undepleted) consumables at all the other locations.

In other words, all consumables arriving at this site automatically have a "status" which equates to "marked for destruction". Once these are received at this site, their status can be considered as "destroyed". In reality, however, there may be some time between their acceptance and actual destruction.

Managers Viewpoint

Reports

Discrepancy Reports

Several types of exception and discrepancy reports are identified in the section entitled "Exceptions".

On-Hand Consumables Inventory Report as of a Specific Date.

The IMS provides access to current on-hand inventory data on an ad-hoc basis via a web-based report. A manager can use the interface to view a Consumables Inventory Report for any selectable month. An example is shown below. The final report also includes a count of cleaning tapes.

| On-Hand Consumables Inventory Report Jun. 19, 2003 (10:35:15 PM) | |
|---|---|
| Location | Quantity |
| Card Stock | |
| Trenton (Reg) | 9,250 |
| Matawan | 4,400 |
| . | . |
| . | . |
| . | . |
| Total of all offices | 25,362 |
| Print Ribbons | |
| Trenton (Reg) | 20 |
| Matawan | 5 |
| . | . |
| . | . |
| . | . |
| Total of all offices | 300 |
| Laminate Roll (Front) | |
| Trenton (Reg) | 41 |
| Matawan | 30 |
| . | . |
| . | . |
| . | . |
| Total of all offices | 714 |
| Laminate Roll (Back) | |
| Trenton (Reg) | 41 |
| Matawan | 30 |
| . | . |
| . | . |
| . | . |

Monthly Consumables Statistics Report

The system automatically generates a monthly web-based report of consumables activity for all the card issuing offices.

There are two types: by office and by type. These reports will be available through the web interface. Samples are shown in FIGS. 9 and 10.

Monthly Card Statistics Report

The system will automatically generate a report of card statistics for all the card issuing offices. This report will be available through the web interface. A samples is below.

| Monthly Card Statistics June 2003 | | | | | |
|---|---|---|---|---|---|
| Office | Issued | Marked For Destruction | Issued-not-Scanned | Un-account-ed for | Total Consump-tion |
| Eatontown | 1888 | 14 | 5 | 3 | 1910 |
| Lawrenceville | 1488 | 2 | 3 | 2 | 1495 |
| Trenton | 3888 | 22 | 7 | 4 | 3921 |
| ... | | | | | |
| ... | | | | | |
| Total | 180000 | 330 | 102 | 76 | 180330 |

Exceptions

The IMS handles several types of exceptions. The exceptions identified below cause a spontaneous exception report to be sent to the parties identified in that exception. The generation of all reports is a centralized activity.

a) Consumables missing in-transit, i.e., delinquent shipment. Delinquent shipments will be detected automatically by the system. The shipment record for each shipment will specify an expected receive date. If this date is exceeded with the record remaining unprocessed, a report will be sent via email to one or more people from Vendor and the State (ISSUER State Inventory Manager). The report will indicate details such as the number of boxes, shipper tracking number(s), destination, ship date, and expected receive date so that the delinquency can be investigated.

b) Inventory counting discrepancy. A monthly inventory counting will be performed in each agency office as described in the section "Inventory Counting." Any discrepancies resulting from this activity will be recorded in the IMS. A discrepancy report will immediately be sent via email to ISSUER management parties (ISSUER State Inventory Manager). ). The report will identify the consumables and quantities that are missing or in excess of expectations and the person performing the counting function.

c) Receipt of shipment discrepancy. Any discrepancies in shipments received at an agency office will immediately result in the creation of a shipment discrepancy report sent to appropriate Vendor and ISSUER personnel (ISSUER State Inventory Manager). ). The report will indicate details such as the items in error, shipper tracking number(s), destination, and ship date, so that the discrepancy can be investigated.

d) Transfer of MFD consumables discrepancy. When a shipment of consumables marked for destruction is prepared, it is possible that some items may be missing or in excess. These discrepancies will be identified in a "Transfer of MFD Consumables Discrepancy Report", which will include the name of the person processing the shipment. ISSUER recipients for this report are ISSUER State Inventory Manager.

e) Receipt of MFD consumables discrepancy. When a shipment of consumables marked for destruction is received at headquarters, it is possible that some items may be missing or in excess. These discrepancies will be identified in a "Transfer of MFD Consumables Discrepancy Report", which will include the name of the person processing the shipment. ISSUER recipients for this report are ISSUER State Inventory Manager). We need to track the time the MFD consumables left the agency and the time they were received at the destruction location. This would give our investigations unit a possible clue of wrong doing.

Technical Notes of Interest

Electronic Packing List (EPL)

The EPL is developed by Vendor as a product of the shipping process. It is transmitted electronically (via email or FTP—as agreed to with the State, and is processed by the IMS. This processing enables each agency office to see the shipment as a list of items to expect.

XML Format for Electronic Packaging List
  EPL Element

The epl element is the root element. It has no attribute but contains two child elements:

```
                             package and card_details.
                             <epl>
                               <package>
                               ...
                               </package>
                               <card_details>
                               ...
                               </card_details>
                             </epl>
                                  package element
```

The package element describes the packaging of a shipment. It contains the following child elements:
  track_num
  destination_office
  exp_arrival_date
  box_count
  shipment_box In particular, each shipment box is represented by a shipment_box element.
  Track_Num Element The track_num element is a simple element that contains the tracking number of the package.
  Destination_Office Element The destination_office element is a simple element that contains the name of the destination office for the shipment.
  Exp_Arrival_Date Element The exp_arrival_data element is a simple element that contains the expected arrival date of the shipment at the destination office.
  Box_Count Element The box_count element is a simple element that contains the number of boxes in the shipment.
  Shipment_Box Element The shipment_box element is a compound element that contains other elements.
  Track_Num Element The track_num is a simple element that contains the tracking number of the shipping box.

Item Element

The item element is used to represent a self-contained item in a shipping box. The item can be a card box, a card tray, a pack of top laminate or a pack of printer ribbons. The item element may have several child elements that describe the type, quantity and identification of such an item.

Type Element

The type element contains the type of the item. The following are the valid types:
- Card Box
- Card Tray
- Card Pack
- Top Laminate
- Bottom Laminate
- Print Ribbon
- Cleaning Tape Quantity Element The quantity element contains the quantity of material contained in an item. For example, if an item is a pack of 5 top laminates, the quantity would be 5. This element is optional for card box, tray or pack.

Barcode Element

The barcode element contains the barcode of an item. Currently, only card boxes, trays and packs have barcodes associated with them.

Card_Details Element

The card_details element contains data about each card in the package.

Card Element

There is one card element per card. A card element contains four child elements specified below.

Box_Barcode Element

The box_barcode element contains the barcode of the card box. If the card is not contained in a box, this element would be empty.

Tray_Barcode Element

The tray_barcode element contains the barcode of the card tray. If the card is not contained in a tray, this element would be empty.

Pack_Barcode Element

The pack_barcode element contains the barcode of the card pack. Since a card must be in a pack, this element may not be empty.

EIN Element

The EIN element contains the Embedded Inventory Number of the card. This element may not be empty.

EXAMPLE

```
<epl>
<!-- Detail on packaging -->
<package>
<track_num>9900</track_num>
<destination_office>Rahway</destination_office>
<exp_arrival_date>July 11, 2003</exp_arrival_date>
<box_count>2</box_count>
<!-- Shipment box 1 -->
<shipment_box>
```

-continued

```
<track_num>9900</track_num>
<item>
<type>Card Tray</type>
<barcode>3377</barcode>
</item>
<item>
<type>Top Laminate</type>
<quantity>5</quantity>
</item>
<item>
<type>Print Ribbon</type>
<quantity>1</quantity>
</item>
</shipment_box>
<!-- Shipment box 2 -->
<shipment_box>
<track_num>9901</track_num>
<item>
<type>Card Box</type>
<barcode>1234</barcode>
</item>
</shipment_box>
</package>
<!- Detail for each card -->
<card_details>
<card>
<box_barcode></box_barcode>
<tray_barcode>3377</tray_barcode>
<pack_barcode>2100<pack_barcode>
<EIN>111111</EIN>
</card>
<card>
<box_barcode>1234</box_barcode>
<tray_barcode>3333</box_barcode>
<pack_barcode>1100</pack_barcode>
<EIN>444444</EIN>
</card>
. . .
</card_details>
</epl>
```

Barcode Reader Scanner

The State will provide trigger type 1D barcode scanner which attaches to a PC via the keyboard. The physical connecting device is referred to as a keyboard wedge. The scanner plugs into the P/S2 port (or equivalent) on the PC. The keyboard will plug into the keyboard wedge connector. Vendor will recommend scanners to the State, however, the State will purchase and install these scanners to a separate workstation designated for supporting the IMS web-pages.

This type of scanner will dump text to the screen just as though it was typed by hand. Typically, a user will select the input field into which the barcode is to be input, click the trigger and scan in the barcode.

Database

The IMS database will be implemented in Oracle database software on the Central Image Repository (CIR) system. The CIR and the IMS will utilize the same instance of the database to minimize operational impact. It will include permanent records for cards. There will be permanent records with consumable statistics information for each office on a monthly and year-to-date basis. Tables will exist to maintain the current on-hand inventory in each office. Tables will exist with temporary entries to track shipments sent from Vendor inventory to agency offices. Similar temporary entries will track transfers of consumables between ISSUER locations. All IMS reports will also be based on data stored within these tables.

Consumables State Diagrams

State diagrams for consumables are described in the following sections. The states identified are assigned to the records of consumable items when tracking them in the IMS database.

Due to the unique nature of cards vs. card packaging vs. non-card consumables, three diagrams are necessary. Cards are uniquely tracked as are card packages. However cards have different normal end states such as "issued" vs. card packaging which ends up "depleted". Non-card consumables are different in that they are not uniquely tracked, but instead are only tracked in quantities.

State Definitions

The states used in the state diagrams in this section are defined here.

| State/Status | Applicable Consumable Types | Description |
| --- | --- | --- |
| Consumables State Definitions | | |
| Accepted | All | This item of a shipment from Vendor inventory has been verified to be in the shipment, but has not been added to inventory records. |
| Depleted | Card packaging, bottom laminate, and cleaning tape. | The item has been consumed. |
| Destroyed | All Consumables | An item previously "marked for destruction" has been destroyed at a secure site, in accordance with established ISSUER procedure. |
| In Transfer | All | Pertains to any consumable shipped from one agency office to another or to headquarters for destruction. The item has been removed from inventory in the shipping office and is in transit. This status is necessary to differentiate it from shipments from Vendor. See description of "in-transit". |
| In_VENDOR_Inventory | All | Applies to all consumables in stock in the Vendor warehouse. These are items that have not shipped to ISSUER and are in the Vendor Inventory Tracking System. |
| In_ISSUER_Inventory | All | Applies to all consumables. Item is on hand at the identified agency office. For cards, card is in an unopened pack. For card packaging, package is unopened. For other consumables, the database will list a quantity of items on hand, which are unused. |
| In-Transit | All | Applies to all consumables, this item has been shipped from Vendor to an agency office. |
| In-Use | Cards, card packaging | Applies to cards or card packaging. For cards, card is assumed (see assumption 1) in printer or is from an open pack. For card packaging, the package (pack, tray, or box) has been opened for use. |
| Issued | Cards only | The card has been acceptably printed and scanned |
| Marked for Destruction | Cards, top laminate, printer ribbons (i.e. security consumables) | The item is in a designated location (e.g., a box labeled "for destruction"). |
| Missing In Transit | All | Pertains to items and packages not received in shipment from Vendor inventory. |
| Unaccounted for | Card packages and non-card consumables | Items which can no longer be accounted for. |
| Unaccounted for or Issued-not-scanned | Cards | Cards which can no longer be accounted for. They may have been issued but not scanned at the ICS, lost before being printed, lost after being Marked for Destruction, etc. This area is where the greatest vulnerability is. ISSUER will need to put in place additional compensating procedural controls to educe the risks. |
| Receiving | All | Items are part of a shipment from Vendor inventory, which is in the |

-continued

Consumables State Definitions

| State/Status | Applicable Consumable Types | Description |
| --- | --- | --- |
| | | process of being verified prior to becoming part of permanent inventory records. |
| Returning | All | This item of a shipment from Vendor inventory has been verified to be in the shipment, but is to be returned and not be added to inventory records. |
| Stolen/Issued | Cards | This state was requested by the state. At least initially the IMS will not support this state. In the meantime, the Comprehensive System can record the fact that a card was stolen after issuance. |
| Stolen/Not-Issued | Cards, card packages | If blank cards are determined to be stolen this state can manually be entered for cards and card packages. |
| Transferred for Destruction | All Security Consumables (used print ribbon, top laminate rolls and cards marked for destruction) | Pertains to defective cards which are in transit to headquarters where they will be destroyed. |

Figure 6:
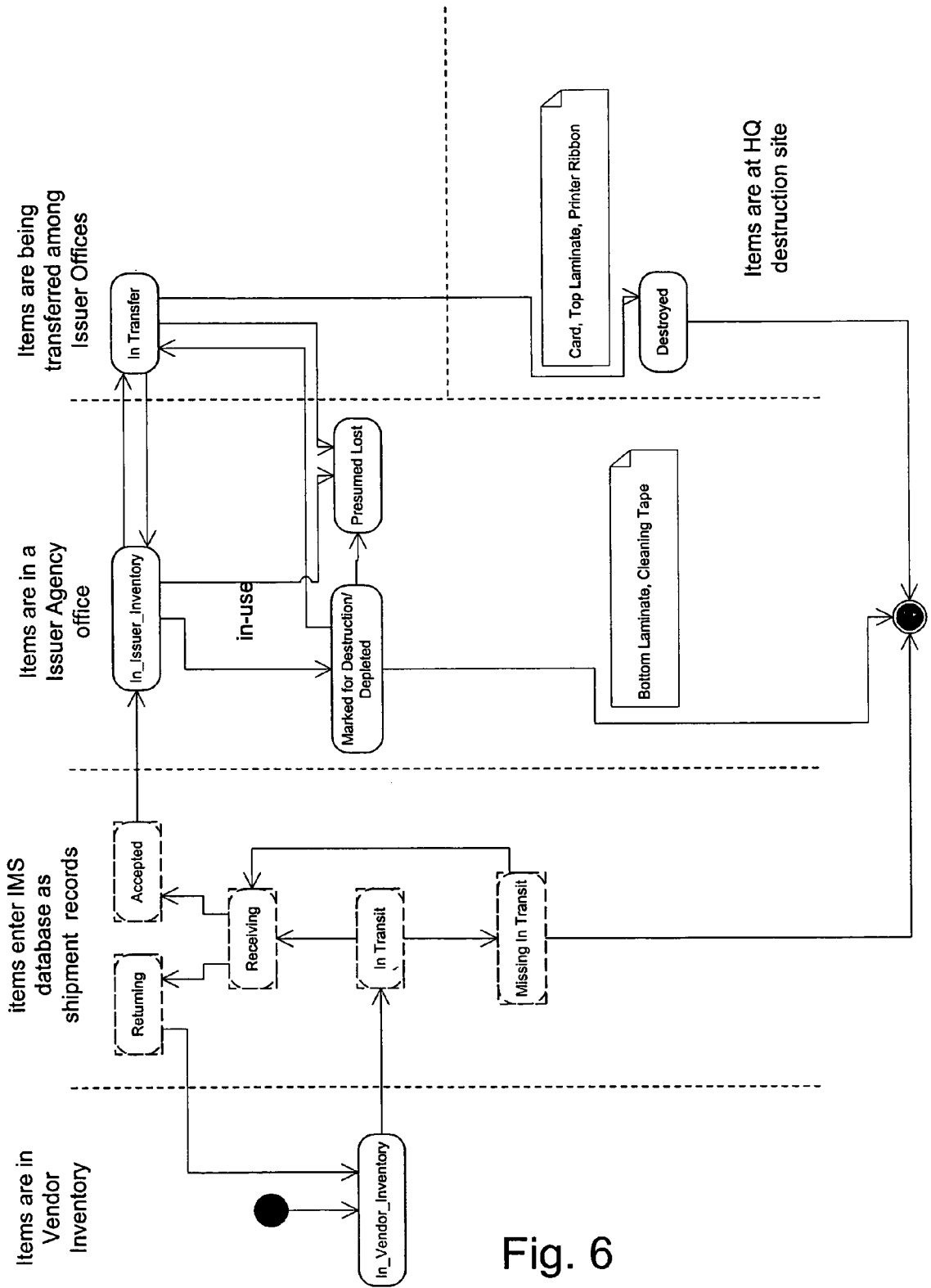
FIGS. 6–8 provide examples of state diagrams for tracking state of consumables in an ID document issuance system.

Non-Card Consumables Diagram (FIG. 6)

The diagram in FIG. 6 shows the states for consumables such as print ribbons, laminate, printer cleaning tapes. It may be helpful to remember that non-card consumables cannot be tracked individually (as cards are) but instead are tracked only as quantities of items in any given state described here.

Note that the diagrams are divided by dashed lines which partition the diagram into logical sections with somewhat unique behavior or processing. Each of the drawing sections is identified and explained.

Section Identified as: "Items are in Vendor Inventory"

All consumables normally originate at the Vendor warehouse in Vendor inventory (state marked In_VENDOR_Inventory. As part of processing the shipment in Vendor inventory, an Electronic Packaging List (EPL) is created and sent to the IMS database in ISSUER. This creates the transition to the next section.

Section Identified as: "Items Enter IMS Database as Shipment Records"

An EPL has now been sent and recorded in the IMS database. This creates temporary shipment records in the IMS DB. These records are used to record the status of items during processing of the shipment when it is received at an agency office and prior to adding them to permanent inventory records. During processing of the individual items, the record for each type of non-card consumable can go through the various states indicated in this section. When the Sending/Receiving clerk first scans the tracking number of one of the boxes, the items in the shipment enter the "Receiving" state. As the contents are verified and accepted, the state of those items becomes "accepted". Once all packages in the shipment are processed, the "accepted" items are entered into the IMS DB as permanent inventory records.

Items can enter the "Returning" state if they were received in error. These are returned to Vendor inventory, The change in status will need to be performed manually, and do not become part of permanent inventory records.

Packages not received in the shipment, will become "Missing-in-Transit". These items are communicated to the ISSUER via the shipment discrepancy report. This is an exception case which requires a follow-up by the Vendor In-State Manager. These items may keep this status until the shipment is received. These items will not be entered into the permanent inventory records unless received and subsequently processed.

Section Identified as: "Items are in a ISSUER Agency Office"

The section refers to items that have been received and accepted into ISSUER permanent inventory records.

There are two "normal" states in this section—"In_ISSUER_Inventory" and "Marked for Destruction". The IMS always has the current count of items in these states at each office (depending on consistency of agency employees to record consumable usage information). Note that, each item passes through an assumed state "in-use" which is not tracked. It is assumed that a quantity of one of each non-card consumable always exists in this state. Therefore there is no count of items in that state.

The "Unaccounted For" state is used for items that are unaccounted for during monthly inventory counting or that have not been received after transfer (see next paragraph). These items become a statistic in the Monthly Consumables Statistics Report against the originating office.

Sections Identified as: "Items are Being Transferred . . . " and "Items are at HQ . . . "

Items can be transferred from inventory of one office to another. This is the state transition "In_ISSUER_Inventory" to "In Transfer" and back. Also, items can be transferred to headquarters (HQ in the diagram) for destruction. This is the state transition "Marked for Destruction" to "In Transfer" to "Destroyed".

While in the "In Transfer" state, items exist in temporary transfer records in the IMS DB, as opposed to the office inventory records. These records are used to assist in processing the sending and receipt of intra-state shipments. A received inter-office transfer returns items to permanent inventory records. Items received from a transfer to HQ for destruction are added to the count of items received for destruction.

Figure 7:
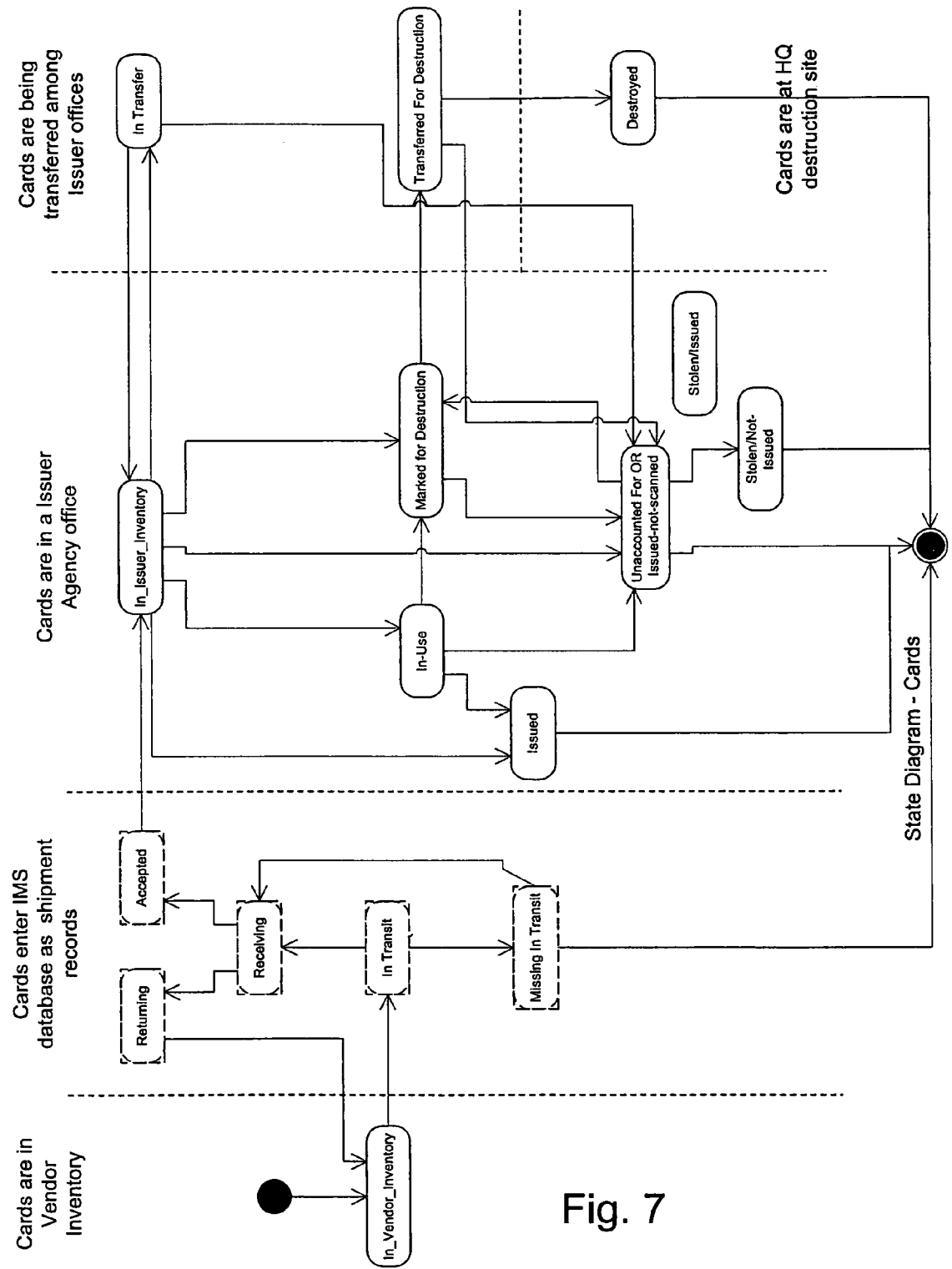

Card State Diagram (FIG. 7)

The state diagram in FIG. 7 shows examples of the states for cards. Keep in mind that cards are tracked individually in this implementation.

Note that the diagrams are divided by dashed lines which partition the diagram into logical sections with somewhat unique behavior or processing. Each of the drawing sections is identified and explained.

Section Identified as: "Cards are in Vendor Inventory"

All consumables normally originate at the Vendor warehouse in Vendor inventory (state marked In_VENDOR_Inventory. As part of processing the shipment in Vendor inventory, an Electronic Packaging List (EPL) is created and sent to the IMS database in ISSUER. This creates the transition to the next section.

Section Identified as: "Cards Enter IMS Database as Shipment Records"

An EPL has now been sent and recorded in the IMS database. This creates temporary shipment records in the IMS DB. These records are used to record the status of items during processing of the shipment when it is received at an agency office and prior to adding them to permanent inventory records. During processing of received shipments, cards are tracked via the packages they arrive in. The states are shown in this diagram are for completeness, even though an individual card will not have a database entry with the states indicated.

For an understanding of the states in this section of the diagram, please refer to the description of the state diagram for Card Packages in this section.

Section Identified as: "Cards are in a ISSUER Agency Office".

The section refers to cards that have been received and accepted into ISSUER permanent inventory records.

The normal state transition in this section is from "In_ISSUER_Inventory" to "In-Use" to "Issued." (Note that the state transition from "In_13_ISSUER_Inventory" directly to "Issued" may occur if card packs are loaded into the printer without being scanned. In this case, the first card of every pack would follow this transition. The existence of this transition will depend on discussions between Vendor and the State regarding the workflow for loading cards.) The state "Marked for Destruction" is reached when the ICS operator scans a card as defective.

The "Unaccounted For OR Issued-not-scanned" state refers to cards whose status is unknown after an extended period of time of being "In-Use", "Marked for Destruction", or In-Transfer. Cards can also enter this state if the card pack they came from is in the state "Unaccounted for." Cards can enter the state "Stolen/Not Issued" thru a manual database operation when the card pack they came from is marked "Stolen/Not Issued."

The state "Stolen/Issued" is not strictly supported by the IMS. That is why that state in the diagram shows no links to it. Instead, a card in this state will show "Issued" in the IMS. The ISSUER Comprehensive System can record this status if necessary.

Sections Identified as: "Cards are Being Transferred within ISSUER" and "Cards are at HQ Destruction Site"

Cards can be transferred from inventory of one office to another. This is the state transition "In_ISSUER_Inventory" to "In Transfer" and back. Cards are in the state "Transferred for Destruction" when transferred to headquarters (HQ in the diagram) for destruction.

While in the "In Transfer" state, cards also exist in temporary transfer records in the IMS DB. These records are used to assist in processing the sending and receipt of intra-state shipments. A received inter-office transfer returns a card to an "In_ISSUER_Inventory" state. Cards received from a transfer to HQ for destruction receive the state "Destroyed"

Figure 8:
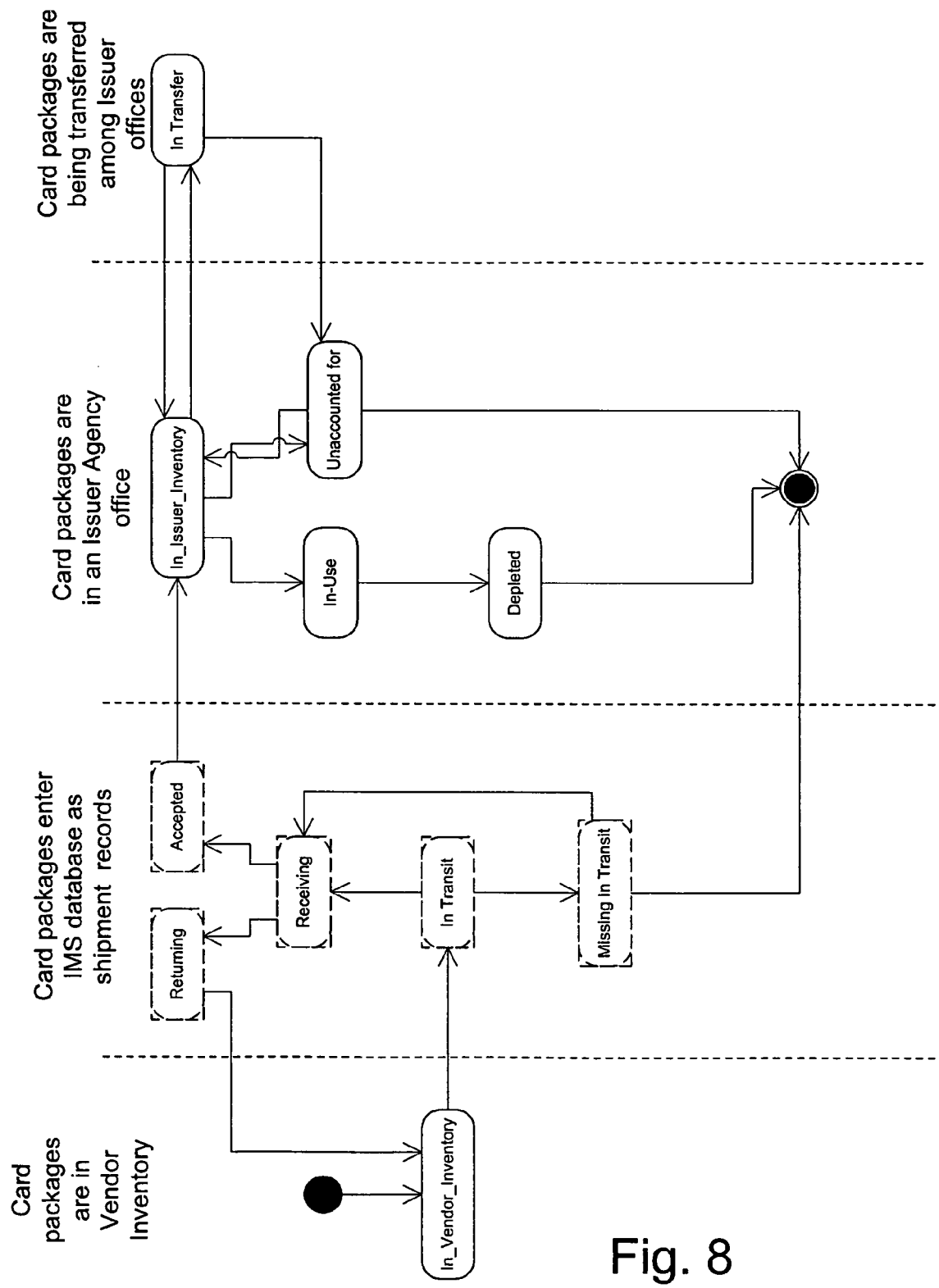

Card Packaging State Diagram (FIG. 8)

The state diagram in FIG. 8 shows the states for card packages (boxes consisting of 4 trays, trays of 8 card packs, card packs of 100 cards). Keep in mind that card packages are tracked individually, but have different end states than cards.

Note that the diagrams are divided by dashed lines which partition the diagram into logical sections with somewhat unique behavior or processing. Each of the drawing sections is identified and explained.

Section Identified as: "Card Packages are in Vendor Inventory"

All consumables normally originate at the Vendor warehouse in Vendor inventory (state marked In_VENDOR_Inventory. As part of processing the shipment in Vendor inventory, an Electronic Packaging List (EPL) is created and sent to the IMS database in ISSUER. This creates the transition to the next section.

Section Identified as: "Card Packages Enter IMS Database as Shipment Records"

An EPL has now been sent and recorded in the IMS database. This creates temporary shipment records in the IMS DB. These records are used to record the status of items during processing of the shipment when it is received at an agency office and prior to adding them to permanent inventory records. During processing of the individual card packages, the record for each package can go through the various states indicated in this section. When the Sending/Receiving clerk first scans the tracking number of one of the boxes, the items in the shipment enter the "Receiving" state. As the contents are verified and accepted, the state of those items becomes "accepted". Once all packages in the shipment are processed, the "accepted" items are entered into the IMS DB as permanent inventory records.

Card packages can enter the "Returning" state if they were received in error. These are returned to Vendor inventory, and do not become part of permanent inventory records.

Packages not received in the shipment, will become "Missing-in-Transit". This is an exception case which requires a follow-up by persons (TBD) at Vendor. These items may keep this status until the shipment is received. These items will not be entered into the permanent inventory records unless received and subsequently processed.

Section Identified as: "Card Packages are in a ISSUER Agency Office"

The section refers to card packages that have been received and accepted into ISSUER permanent inventory records.

The normal state transition in this section is from "In_ISSUER_Inventory" to "In-Use" to "Depleted."

The "Unaccounted For" state is refers to card packages which are unaccounted for after monthly inventory counting or "In Transfer" for an extended time.

Sections Identified as: "Card Packages are Being Transferred within ISSUER"

Card packages can be transferred from inventory of one office to another. This is the state transition "In_ISSUER_Inventory" to "In Transfer" and back.

While in the "In Transfer" state, card packages are recorded in temporary transfer records in the IMS DB. These records are used to assist in processing the sending and receipt of intra-state shipments. A received inter-office transfer returns a then to an "In_ISSUER_Inventory" state.

UI Layout

The following sections describe user interfaces for the implementation

Logon

Logon is accomplished through a web-interface portal of the IMS corresponding to the issuer.

"Home Page" Views

Figure 11:
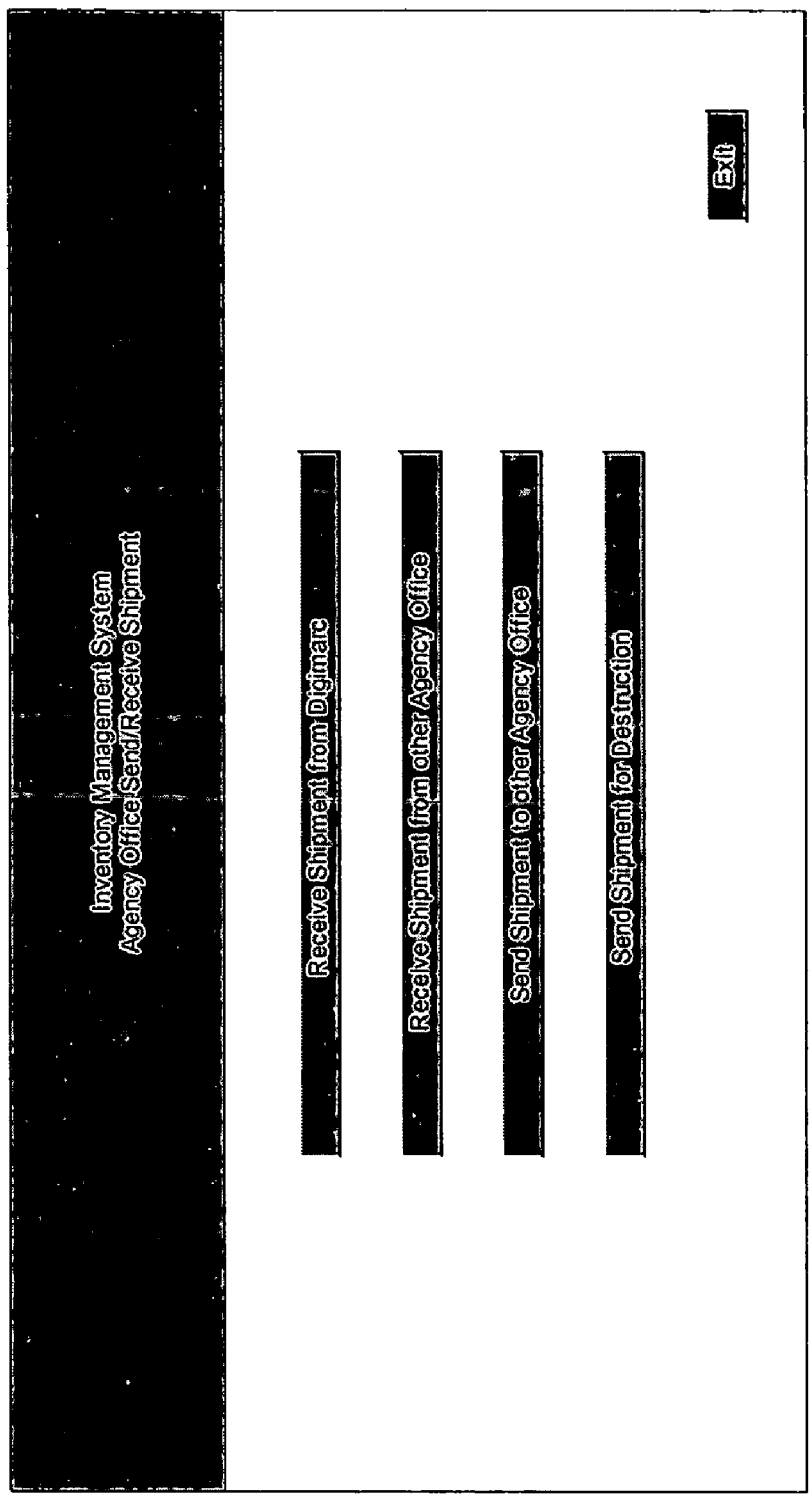
FIG. 11 illustrates an example of a Sending/Receiving home page.

FIG. 11 illustrates an example of a Sending/Receiving home page.

Figure 12:
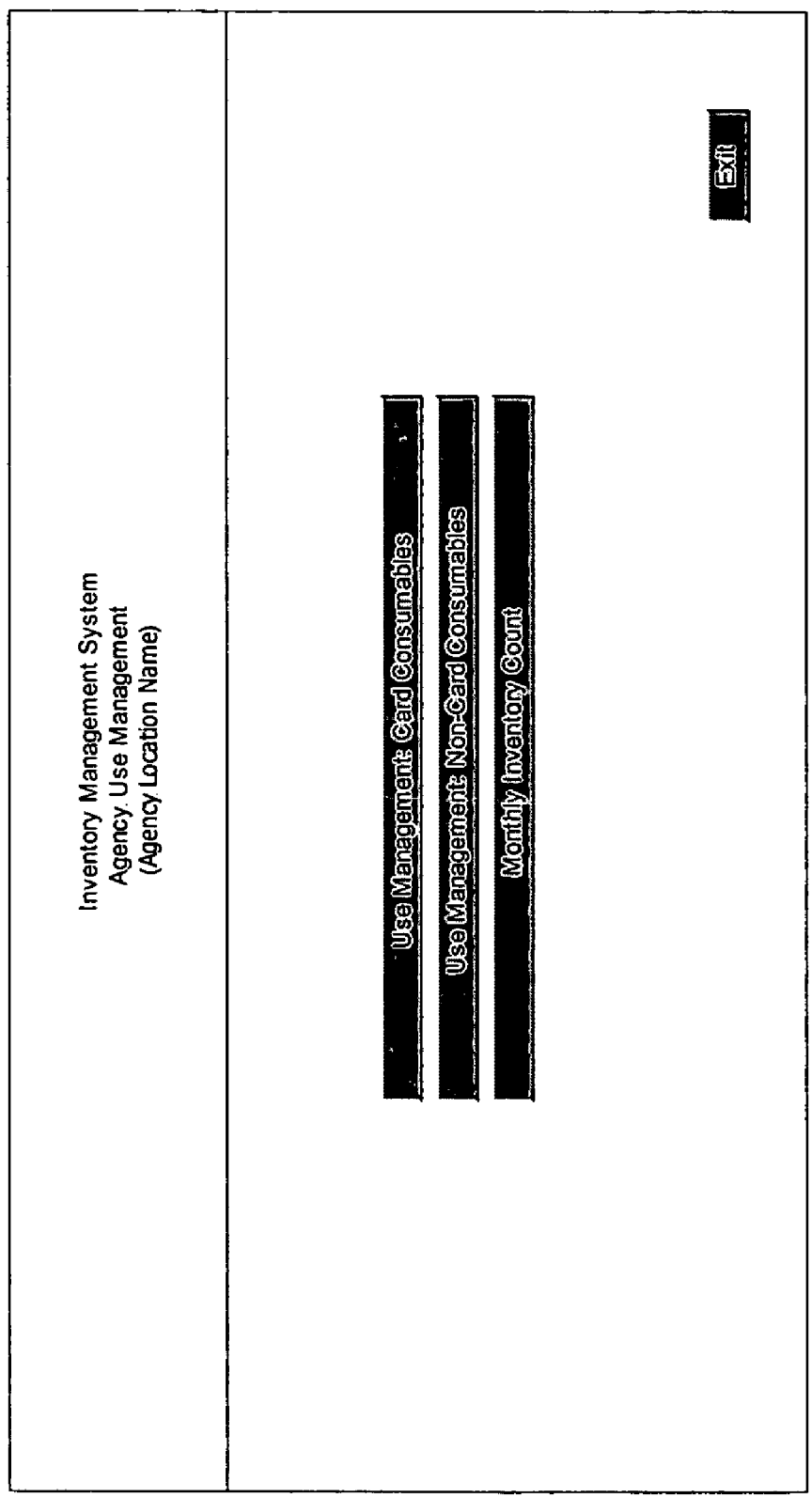
FIG. 12 illustrates an example of a Use Manager home page.

FIG. 12 illustrates an example of a Use Manager home page.

Figure 13:
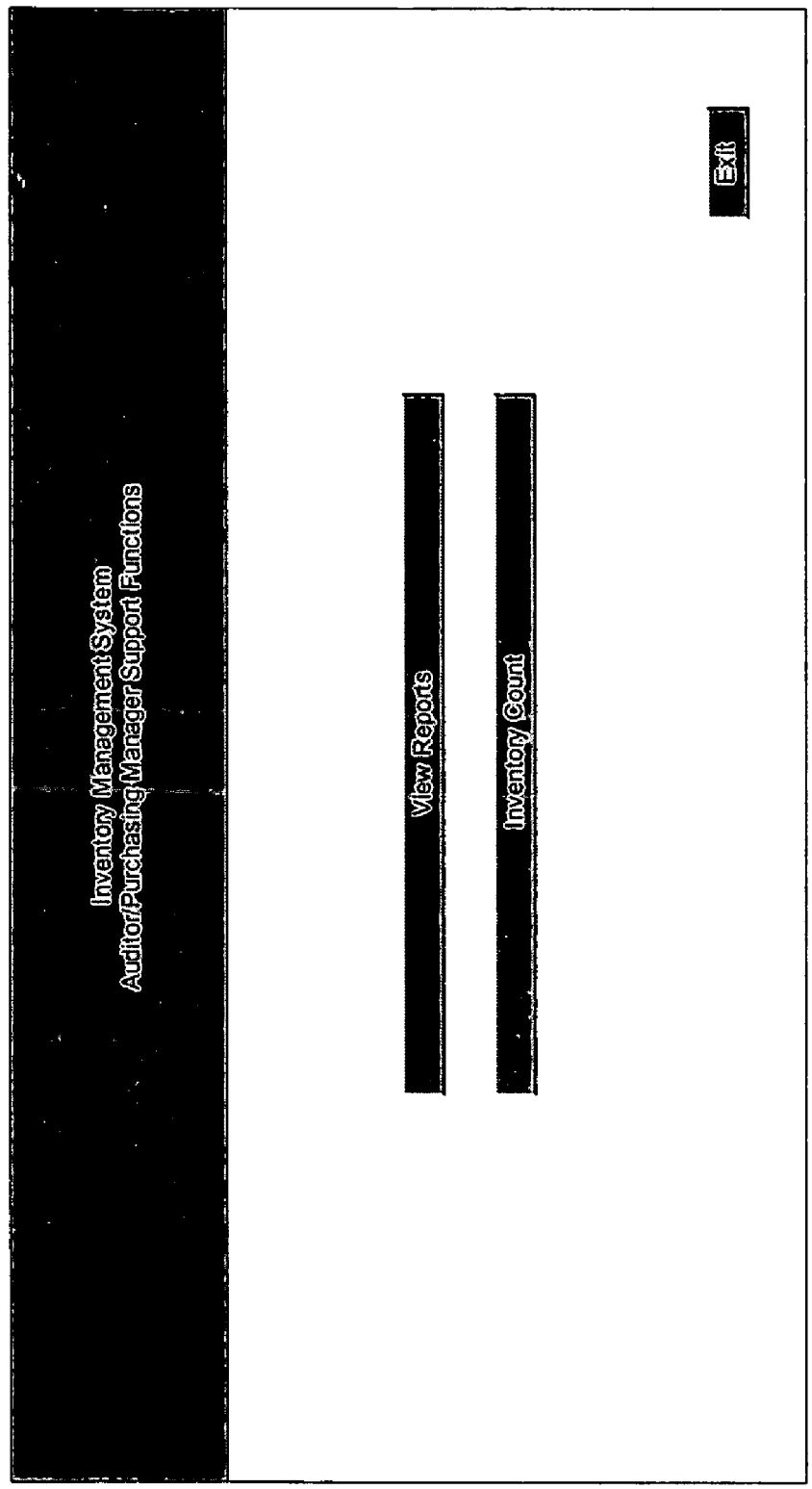
FIG. 13 illustrates an example of an Auditor/Purchasing manager home page.

FIG. 13 illustrates an example of an Auditor/Purchasing manager home page.

Sending and Receiving Interfaces

FIGS. 14–26 show various interfaces used for managing the sending and receiving of consumables, use management, and inventory auditing in the inventory management system.

Figure 14:
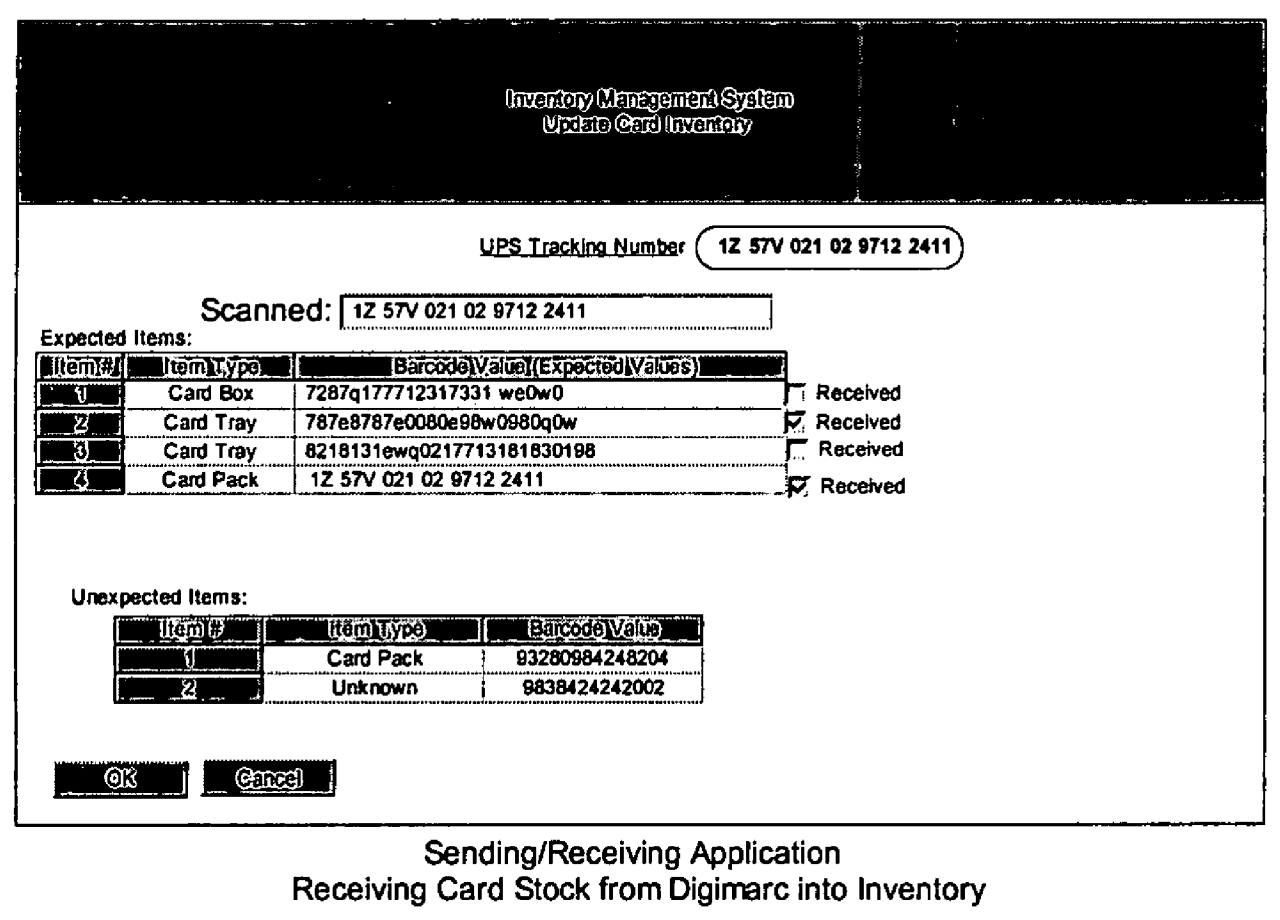

FIG. 14 shows an example of a user interface for managing the receipt of card stock from a vendor into inventory. FIG. 15 shows an example of a user interface for managing the receipt of other consumables from a vendor.

Figure 16:
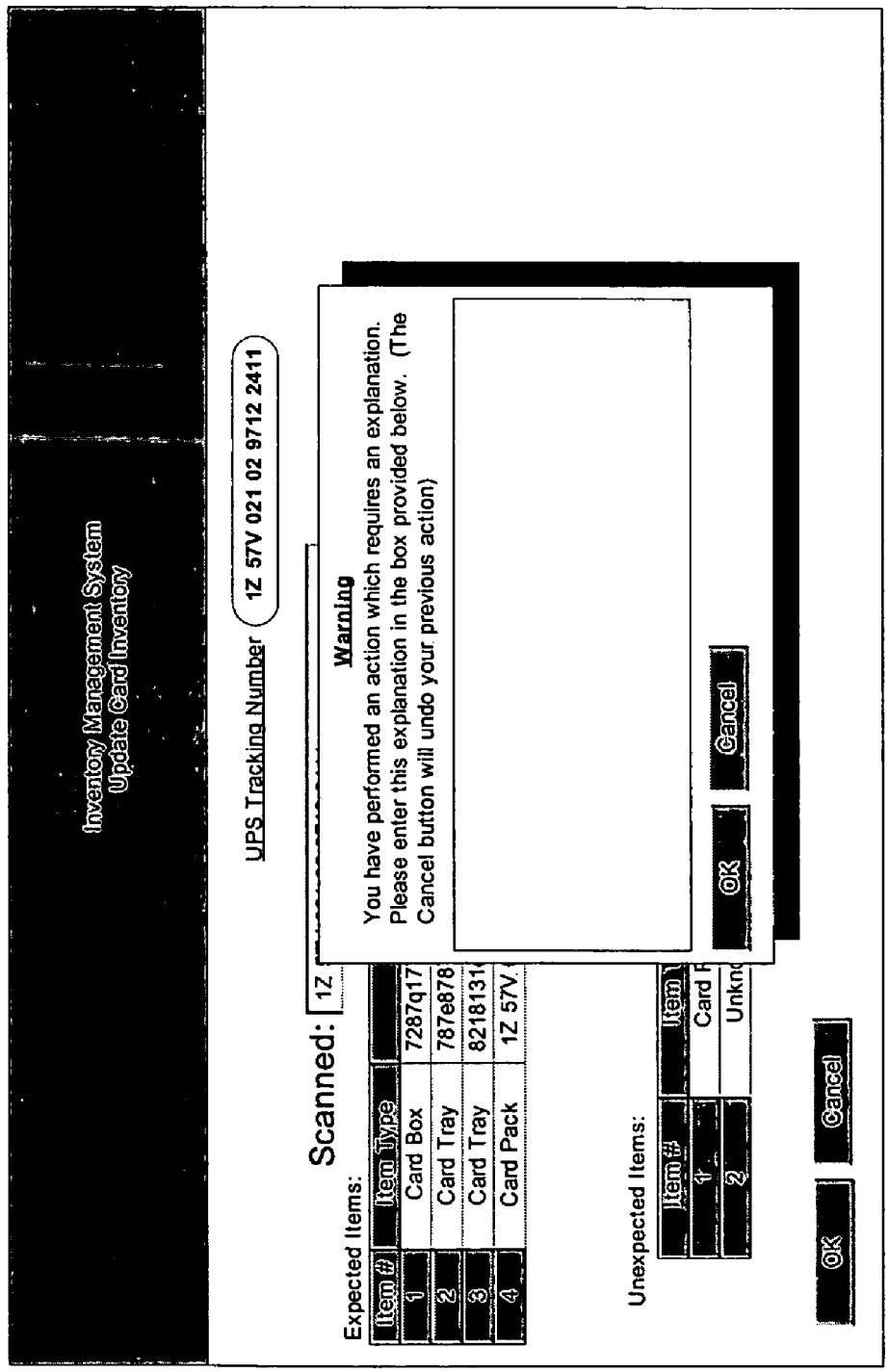

FIG. 16 shows an example of a user interface for handling exceptions relating to receiving items into inventory.

FIG. 17 shows an example of a user interface for managing sending inventory between offices.

FIG. 18 shows an example of a user interface for managing receipt of card stock inventory from another office. FIG. 19 shows an example of a user interface for managing receipt of other consumables from another office.

FIG. 20 shows an example of a user interface managing sending consumables for destruction, while FIG. 21 shows an example of a user interface for receiving consumables for destruction.

Figure 23:
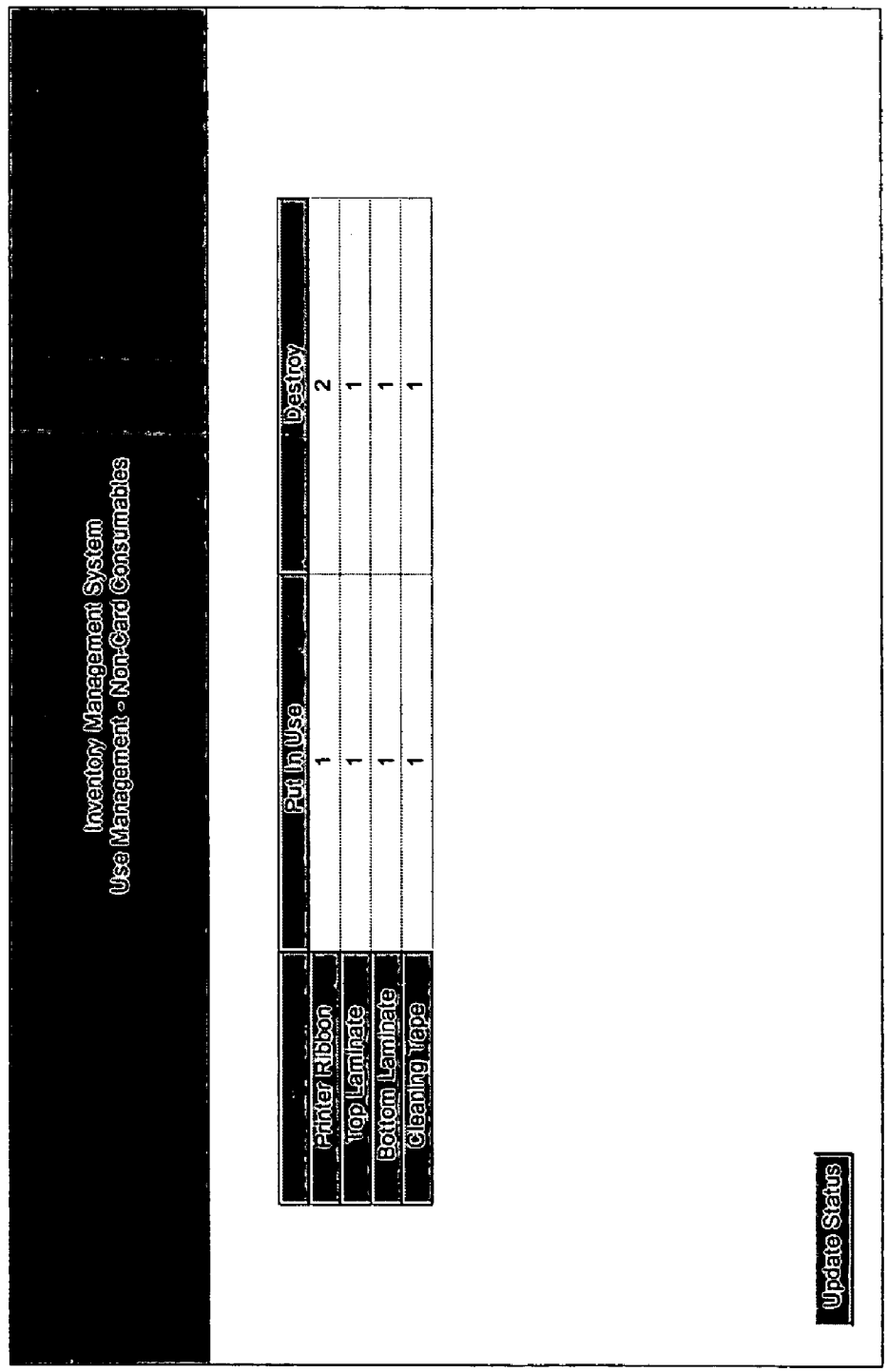

FIGS. 22–23 show user interfaces for applications controlling use management of consumables.

Figure 24:
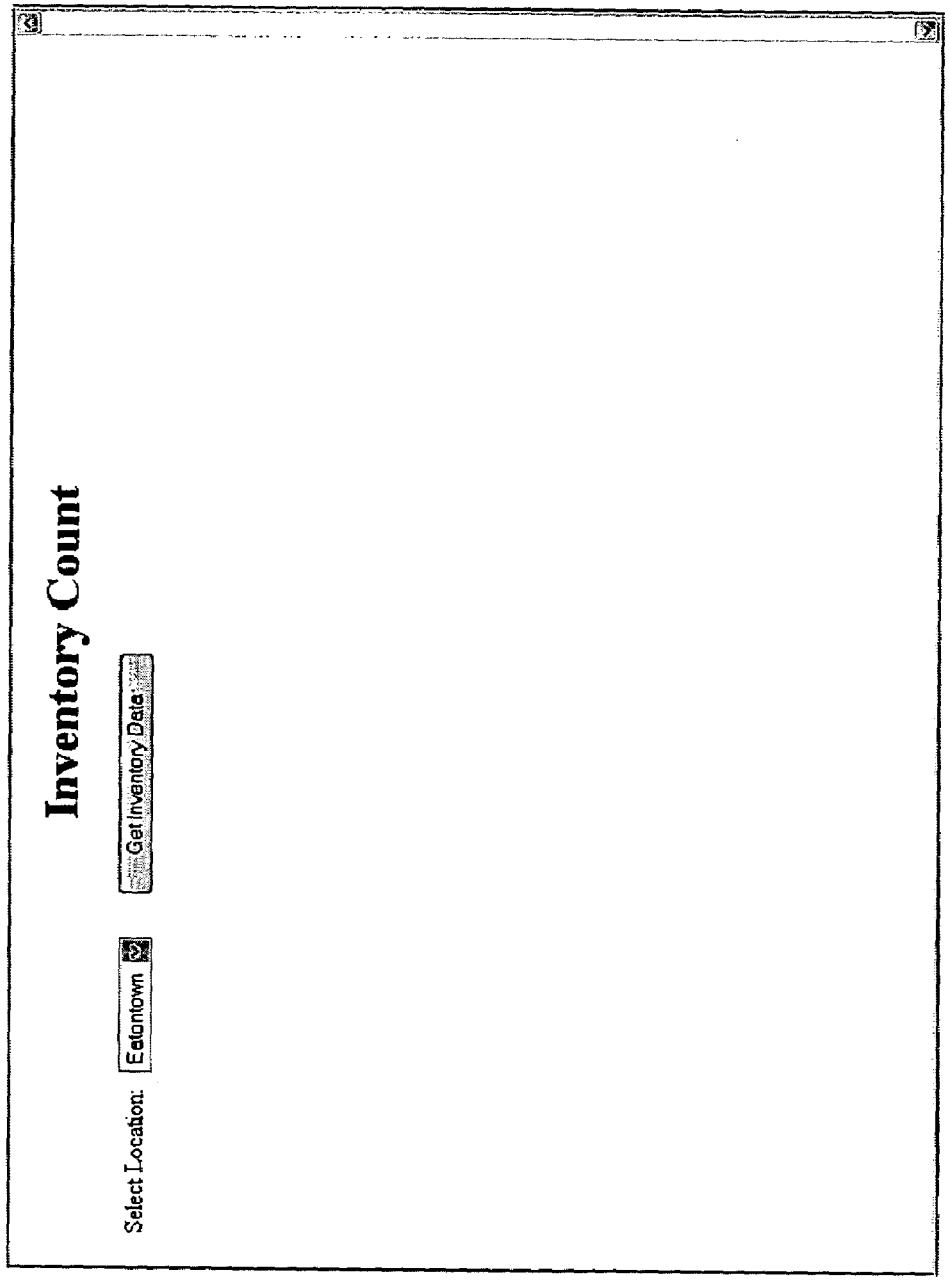

FIGS. 24–26 show user interfaces for accessing inventory count information, reconciling inventory with actual counts, and reporting discrepancies between inventory actual and system inventory counts.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software, including firmware and other machine executable instructions. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for managing inventory of consumables used to create an identification document, the method comprising:
   defining ID document consumable states in an ID document issuance system, the consumable states serving to track states of card and non card consumables through inventory, shipment, and use, said card and non card consumables being used to create an identification document;
   tracking state of consumables between a vendor inventory tracking system and an issuer inventory management system, wherein the vendor inventory tracking system and issuer inventory management system communicate electronically to update states of consumables as the consumables are processed through ID document issuance; and
   tracking lost or stolen consumables using the vendor inventory tracking system and the issuer inventory management system.

2. The method of claim 1 wherein the vendor and issuer systems communicate automatically via a web interface in response to changes in consumable state between the tracking and management systems.

3. The method of claim 1 wherein the vendor and issuer systems use an electronic list transmitted among the systems to check actual shipments of consumables against expected shipments of consumables.

4. The method of claim 1 wherein states of consumables are associated with embedded inventory numbers carried in machine readable codes on the consumables.

5. The method of claim 4 wherein the embedded inventory numbers are associated with ID document records in a database, enabling validity of the ID documents to be checked by reading suspect embedded inventory numbers from suspect documents and comparing the suspect numbers with actual numbers stored in the database.

6. The method of claim 1 further including:
   defining roles of participants in ID document issuance process and associating the roles with permissions that control how participant actions in the inventory management system change state of the consumables in the inventory management system.

7. The method of claim 1 wherein consumables are tracked according to a hierarchy of packaging of the consumables.

8. The method of claim 1 wherein the non card consumables include laminates used to make identification documents.

9. The method of claim 1 wherein the non card consumables include printer ribbons used to print identification documents.

10. The method of claim 1 wherein laminates and card blanks used to make ID documents are individually serialized and tracked by serial number in the inventory management system.

11. The method of claim 1 that includes defining plural ID document consumable states, said states including states indicating at least three of the following:
   (a) the consumable is in inventory;
   (b) the consumable is in use;

(c) the consumable is issued;
(d) the consumable is marked for destruction;
(e) the consumable is destroyed.

12. The method of claim 11, that includes at least four of (a)–(e).

13. The method of claim 11, that includes all of (a)–(e).

14. A system for managing inventory of consumables used to create an identification document, the system comprising:
   an issuer inventory management system;
   a vendor inventory tracking system for tracking state of consumables between a vendor inventory and the issuer inventory management system, wherein the vendor inventory tracking system and issuer inventory management system communicate electronically to update states of consumables as the consumables are processed through ID document issuance; and
   the system operable to define ID document consumable states in an ID document issuance system, the consumable states serving to track states of card and non card consumables through inventory, shipment, and use, said card and non card consumables being used to create an identification document;
   the system operable to track lost or stolen consumables using the vendor inventory tracking system and the issuer inventory management system.

15. The system of claim 14 wherein the vendor and issuer systems communicate automatically via a web interface in response to changes in consumable state between the tracking and management systems.

16. The system of claim 14 wherein the vendor and issuer systems use an electronic list transmitted among the systems to check actual shipments of consumables against expected shipments of consumables.

17. The system of claim 14 wherein states of consumables are associated with embedded inventory numbers carried in machine readable codes on the consumables.

18. The system of claim 17 wherein the embedded inventory numbers are associated with ID document records in a database, enabling validity of the ID documents to be checked by reading suspect embedded inventory numbers from suspect documents and comparing the suspect numbers with actual numbers stored in the database.

19. The system of claim 14 further including:
   the system operable to define roles of participants in ID document issuance process and associating the roles with permissions that control how participant actions in the inventory management system change state of the consumables in the inventory management system.

20. The system of claim 14 wherein consumables are tracked according to a hierarchy of packaging of the consumables.

21. The system of claim 14 wherein the non card consumables include laminates used to make identification documents.

22. The system of claim 14 wherein the non card consumables include printer ribbons used to print identification documents.

23. The system of claim 14 wherein laminates and card blanks used to make ID documents are individually serialized and tracked by serial number in the inventory management system.

24. The system of claim 14 wherein the issuer inventory management system is linked to a networked image capture stations at ID document issuing facilities that are used to capture applicant image data.

* * * * *